(12) United States Patent
Chugh

(10) Patent No.: US 6,277,189 B1
(45) Date of Patent: Aug. 21, 2001

(54) COAL COMBUSTION BY-PRODUCTS-BASED LIGHTWEIGHT STRUCTURAL MATERIALS AND PROCESSES FOR MAKING THEM

(75) Inventor: Yoginder P. Chugh, Murphysboro, IL (US)

(73) Assignee: The Board of Trustees of Southern Illinois University, Carbondale, IL (US)

( * ) Notice: Subject to any disclaimer, the term of this patent is extended or adjusted under 35 U.S.C. 154(b) by 0 days.

(21) Appl. No.: 09/386,978

(22) Filed: Aug. 31, 1999

(51) Int. Cl.[7] .................................................. C04B 7/13
(52) U.S. Cl. ................... 106/705; 106/640; 106/708; 106/709; 106/711; 106/819; 106/823; 106/DIG. 1; 264/333
(58) Field of Search .................................. 106/705, 708, 106/709, 711, 640, 819, 823, DIG. 1; 264/333

(56) References Cited

U.S. PATENT DOCUMENTS

| | | |
|---|---|---|
| 2,250,107 | 7/1941 | Nelles . |
| 2,382,154 | 8/1945 | Jones et al. . |
| 4,250,134 | 2/1981 | Minnick . |
| 4,256,504 | 3/1981 | Dunstan, Jr. . |
| 4,344,796 | 8/1982 | Minnick . |
| 4,397,801 | 8/1983 | Minnick . |
| 4,680,059 | 7/1987 | Cook et al. . |
| 5,100,473 | 3/1992 | Mitsuda et al. . |
| 5,106,422 | 4/1992 | Bennett et al. . |
| 5,308,196 | 5/1994 | Frederick . |
| 5,350,549 | 9/1994 | Boyle . |
| 5,374,307 | 12/1994 | Riddle . |
| 5,482,549 | 1/1996 | Blaakmeer et al. . |
| 5,520,730 | 5/1996 | Barbour . |
| 5,536,310 | 7/1996 | Brook et al. . |
| 5,565,028 | 10/1996 | Roy et al. . |
| 5,573,348 | 11/1996 | Morgan . |
| 5,573,588 | 11/1996 | Carrasquillo . |
| 5,578,122 | 11/1996 | Carrasquillo . |
| 5,580,378 | 12/1996 | Shulman . |
| 5,584,792 * | 12/1996 | Webster ............................ 588/257 |
| 5,601,643 | 2/1997 | Silverstrim et al. . |
| 5,622,556 | 4/1997 | Shulman . |
| 5,714,002 | 2/1998 | Styron . |

FOREIGN PATENT DOCUMENTS

3818774 * 12/1988 (DE) .
10-246419 * 9/1998 (JP) .

OTHER PUBLICATIONS

Derwent Abstract No. 1998–255430, abstract of Japanese Patent Specification No. 10–081554 (Mar. 1998).*

* cited by examiner

Primary Examiner—Anthony Green
(74) Attorney, Agent, or Firm—Howell & Haferkamp, LC.

(57) ABSTRACT

Mortar mixes comprising as a major part, Class F fly ash and fluidized bed combustion ash in amounts and proportions sufficient to reduce the negative effects of the presence of unburned carbon in the Class F fly ash and the presence of sulfate in the fluidized bed combustion ash and which mortar mixes also include, as a minor part, a cementitious material. The mortar produced by mixing the mortar mix with water can include a density reduction material and can be formed into support members for use in mines.

81 Claims, 7 Drawing Sheets

COAL COMBUSTION BY-PRODUCTS-BASED LIGHTWEIGHT STRUCTURAL MATERIALS AND PROCESSES FOR MAKING THEM

BACKGROUND OF THE INVENTION (1) Field of the invention

The present invention relates to lightweight structural materials and more particularly to lightweight structural materials produced from coal combustion by-products and materials and processes for making them.

(2) Description of the Related Art

The burning of coal for the generation of steam and electricity creates a large amount of residue in the form of ash. Each year in the United States over one hundred million tons of coal combustion ash is generated and must be used or disposed of in some manner. Most of the ash is now disposed of by on-site landfilling However, some small part of the ash is used as a component in building materials. Potential uses for coal combustion ash have been surveyed by the American Coal Ash Association and include structural fills, embankments, mine reclamation, underground mine backfilling, and cement—concrete, among others.

The physical and chemical composition and characteristics of coal combustion ash can vary depending not only upon the type of coal that is burned, but also upon the type of combustion equipment and the conditions of combustion. Several of the common types of coal ash are class F fly-ash (ASTM C-618-89, Class F; finely divided residue produced from burning anthracite or bituminous coal); fluidized bed combustion (FBC) ash (produced from burning coal with limestone in a fluidized bed combustion furnace); and class C fly ash ASTM Designation No. C618-89, a finely divided residue produced from burning lignite or sub-bituminous coal and having a lime content that is typically higher than 10%). More complete descriptions of the types, properties and composition of various types of coal combustion ash have been provided in, for example, *Material and Research Society Proceedings*, Volumes 43, 113, 136 and 178; *Management of High Sulfur Coal Combustion Residues: Issues and Practices*, pp. 285, Chugh, Y. P. and G. A. Beasley, Eds., Conference Proceedings, Dept. of Mining and Mineral Resources Engineering, Southern Illinois Univ., (1994); *Fly Ash and Coal Conversion By-Products: Characterization, Utilization and Disposal I*, McCarthy, G. J., and R. J. Lauf, Eds., Material Research Society Symposia Proceedings, vol. 43 (1984); *Fly-ash and Coal Conversion By-Products: Characterization, Utilization and Disposal IV*, McCarthy, G. J. and F. P. Glasser, Eds., Material Research Society Symposium Proceedings, Vol. 113 (1987); *Fly-ash and Coal Conversion By-Products: Characterization, Utilization and Disposal V, Hemmings*, R. T., E. Berry and G. J. McCarthy, Eds., Material Research Society Symposium Proceedings, Vol. 136 (1988); and *Fly-ash and Coal Conversion By-Products: Characterization, Utilization and Disposal VI*, Day, R. L. and F. P. Glasser, Eds., Material Research Society Symposium Proceedings, Vol. 178 (1989).

One well known use for coal combustion ash is as a component of a cementitious material for use in cement-concrete as a building material, a rigid fill material, for road construction, or other similar applications. Class C fly ash has been used far more in these applications than Class F, or other coal combustion ash, due to its higher lime content (usually measured as calcium oxide) and, thus, its property of being a cementitious, as well as a pozzolanic (cement-like) material. For example, U.S. Pat. No. 2,250,107, to Nelles, disclosed that fly ash could be used to replace all or part of sand as the aggregate in a cement-based concrete. Jones et al., in U.S. Pat. No. 2,382,154, teach that the addition of a minor amount of an anhydrous alumino-silicate material, such as fly ash, to a major amount of an alumino-silicic acid material, such as provided by shales, slates and clays, and further mixed with an alkaline earth base and water provided a synthetic stone having improved compressive and flexural strength.

More recently, Dunstan, Jr., in U.S. Pat. No. 4,256,504, taught a composition that included a major portion of a fly ash having a calcium content greater than about 20% and a minor portion (i.e., about 5% to 15%) of calcium sulfate. Cook et al., in U.S. Pat. No. 4,680,059, disclosed the production of a building material based on a reactive amorphous silicate that also included an aqueous solution of an iron salt, lime, reinforcing fillers that could be fibers, and from 10% to 50% of a filler containing reactive polyvalent cations that could be fly ash, among other materials. Also, Brook et al. in U.S. Pat. No. 5,536,310, disclosed a cementitious composition that was composed of a cementitious material such as a hydraulic cement, fly ash—preferably Class C fly ash having a high calcium oxide content—and a hydroxycarboxylic acid or salt thereof. However, compositions using Class F fly ash rather than Class C fly ash were also disclosed. The composition was reported to have enhanced strength and durability and reduced permeability while not sacrificing early strength or retarding the set time.

Styron, in U.S. Pat. No. 5,714,002, disclosed a process for making blended hydraulic cement compositions containing sub-bituminous (Class C) fly ash having a lime content of at least about 21% and preferably at least 25%, a retarding agent, citric acid and an alkali source such as potassium carbonate. Other compositions were disclosed where the components just described were blended with a second fly ash that was selected from lignite fly ash, bituminous fly ash and scrubber material. Another composition having a blend of Class C fly ash with a filler material, that could be Class F fly ash, was disclosed by Bennett et al. in U.S. Pat. No. 5,106,422. The composition was composed of water mixed with a major amount of the filler material and a minor amount of the Class C fly ash. The material was reported to have rapid setting properties and to have controllable permanent strength properties.

In U.S. Pat. No. 5,374,307, Riddle discloses a composition for forming construction blocks and encapsulating hazardous materials that includes a pozzolanic fly ash, such as Class C fly ash, mixed with bottom ash and water. The composition can be used as a mortar, or could be compressed and formed into blocks.

Yet more reports of methods and compositions that utilized fly ash as one component in some type of hardened building material are provided in U.S. Pat. Nos. 5,482,549; 5,520,730; 5,565,028; 5,573,588; 5,578,122; 5,580,378; 5,601,643; and 5,622,556.

The production of structurally useful materials containing coal combustion ash other than Class C or Class F fly ash has also been reported. For example, the use of fluidized bed combustion ash (FBC ash) in a process for producing hardened materials was described by Mitsuda et al. in U.S. Pat. No. 5,100,473. Fluidized combustion ash was mixed with water and the mixture was kneaded to form granules. The granules could then either be mixed with an additional amount of powdery combustion ash, or could be treated by steam at atmospheric pressure to obtain hardened material. This material could be broken to obtain a crushed stone-like material for use as a roadbed material.

A potentially attractive use for structural materials that are based upon coal combustion ash is in the production of support posts, beams, crib members, and the like that could be used to replace wooden support members in, for example, underground mines. Wood has proven to be a desirable material for this application due to its high strength-to-weight ratio and its failure mode that is characterized by a crackling sound and continuing to bear a significant load even after initial failure. A significant amount of wood of sound structural quality is now used as mine support members. Its availability, however, is becoming more and more scarce, and the availability is often seasonal. If some suitable replacement for wood were available, the wood now used for mine supports could go to some other, potentially higher value, uses. Furthermore, since the wood supports now placed in mines are generally left in place after mining activities have ceased, they are lost to further use and wasted. Additional problems caused by wooden support members is that wood for this purpose is seasonally available and a scarcity is risked unless an inventory is maintained. Another drawback is that wooden support members are combustible and, thus, increase the fire hazard in the mine.

The use of materials containing high levels of coal combustion ash in mine support members would be particularly advantageous in that it would not only free a significant amount of wood for other, more valuable uses, but would permit the return of a significant amount of coal combustion ash to its source in a useful, safe and non-polluting form. In fact, several reports disclose work in this area. For example, a yieldable confined core mine roof support has been reported by Frederick in U.S. Pat. No. 5,308,196. The support included a yieldable container such as a cylindrical corrugated metal pipe that is filled with a compressible filler such as volcanic pumice, fly ash, cinders and light and heavy aggregate, among others. Morgan, in U.S. Pat. No. 5,573,348, described structural members formed from a cement-based slurry infiltrated fiber material. The cement-based slurry could include a cement-fly ash blend and the structural members were formed by adding the slurry to a pre-formed bed of fibers that substantially filled a mold so that the slurry completely infiltrated the spaces between the fibers.

Numerous methods and compositions are known that incorporate various types or blends of coal combustion ash into structural or building materials. But each type of ash presents some unique property that must be dealt with in order to obtain materials that have useful strength and durability. For example, the relatively high sulfate content of FBC ash causes undesirable swelling during curing and also reduces the durability of cementitious materials in which it is a component. Thus, its level in the material must be limited to provide a swelling strength and durability that is acceptable in the particular application of interest.

In Class F fly ash, the presence of a significant amount of unburned carbon causes an increased water requirement for mixing the mortar. This increased water, in turn, significantly reduces the compressive strength of the cured mortar.

Accordingly, it would be desirable to provide a method for using significant amounts of coal combustion byproducts, particularly high volume byproducts such as fly ash and fluidized bed combustion ash, for the production of structural materials. It would also be desirable to be able to produce these structural materials from coal combustion ash while avoiding at least some of the disadvantages normally associated with low calcium content and high unburned carbon and/or high levels of sulfates in the ash. It would be particularly desirable if these structural materials were suitable for the production of support members that could be used in coal mines to replace wooden support members and that would have strength-to-weight properties and a failure mode similar to that of wood. Furthermore, it would be desirable if these structural members produced from coal combustion ash were durable, non-polluting, fireproof and capable of being cut with a saw and of accepting screws and lag bolts and the like.

SUMMARY OF THE INVENTION

Briefly, therefore, the present invention is directed to a novel mortar mix having a major part of coal combustion by-products, the mortar mix comprising as a major part, a blend of Class F fly ash and fluidized bed combustion (FBC) ash wherein the Class F fly ash and the FBC ash are present in amounts and proportions sufficient to reduce the negative effects of the presence of unburned carbon in the Class F fly ash and the presence of sulfate in the FBC ash and which mortar mix also includes, as a minor part, a cementitious material.

The present invention is also directed to a novel mortar made from about 22 parts to about 35 parts by weight water per 100 parts of the mortar mix described above.

The present invention is also directed to a novel structural composition comprising the cured product of the mortar described above.

The present invention is also directed to a novel method for preparing a mortar mix comprising mixing together into a mortar mix about 50% to about 85% by weight Class F fly-ash and about 1% to about 20% by weight fluidized bed combustion (FBC) ash; and about 5% to about 30% by weight cementitious material.

The present invention is also directed to a novel method for preparing a mortar comprising mixing together about 22 parts to about 35 parts by weight water per 100 parts of a mortar mix that includes about 50% to about 85% by weight Class F fly-ash and about 1% to about 20% by weight fluidized bed combustion (FBC) ash; and about 5% to about 30% by weight cementitious material.

The present invention is also directed to a novel method for making a coal combustion by-product-based structural member comprising the steps of preparing a mortar by the method as set forth in directly above; molding the mortar into a desired shape; and curing the molded mortar into a structural member having a density of about 50 pounds per cubic foot (pcf) to about 100 pcf.

The present invention is also directed to a novel support member for use in mining comprising a support member molded from the cured product of about 50% to about 85% by weight class F fly-ash; about 1% to about 20% by weight fluid-bed combustion (FBC) fly-ash; about 5% to about 30% by weight cementitious material; about 0.5–1.5% by volume fibers; about 22 parts to about 35 parts by weight water per 100 parts combined weight of the class F fly-ash, the FBC fly-ash, the cementitious material and the fibers; and density reducer; the structural composition having a density of from about 50 to about 100 pounds per cubic foot.

The present invention is also directed to a novel mortar mix comprising about 10% to about 25% by weight Class F fly-ash and about 50% to about 85% by weight fluidized bed combustion (FBC) ash; and about 5% to about 30% by weight cementitious material.

The present invention is also directed to a novel method for preparing a mortar comprising mixing together about 25 parts to about 35 parts by weight water per 100 parts of a mortar mix that includes about 10% to about 25% by weight Class F fly-ash and about 50% to about 85% by weight fluidized bed combustion (FBC) ash; and about 5% to about 30% by weight cementitious material.

The present invention is also directed to a novel method for making a coal combustion by-product-based structural member comprising the steps of preparing a mortar by the method as set forth in directly above; molding the mortar into a desired shape; and curing the molded mortar into a structural member having a density of about 20 pounds per cubic foot (pcf) to about 50 pcf.

The present invention is also directed to a novel support member for use in mining comprising a support member molded from the cured product of about 10% to about 20% by weight class F fly-ash; about 50% to about 85% by weight fluid-bed combustion (FBC) ash; about 5% to about 30% by weight cementitious material; about 0.5–1.5% by volume fibers; about 30 parts to about 45 parts by weight water per 100 parts combined weight of the class F fly-ash, the FBC fly-ash, the cementitious material and the fibers; and density reducer; the structural composition having a density of about 20 to about 50 pounds per cubic foot.

Among the several advantages found to be achieved by the present invention, therefore, may be noted the provision of a method for using significant amounts of coal combustion byproducts, particularly high volume byproducts such as fly ash and fluidized bed combustion ash, for the production of structural materials; the provision of a method to produce these structural materials from coal combustion ash while avoiding at least some of the disadvantages normally associated with low calcium content and high unburned carbon and/or high levels of sulfates in the ash; the provision of structural materials that are suitable for the production of support members that could be used in coal mines to replace wooden support members and that would have strength-to-weight properties and a failure mode similar to that of wood; and the provision of structural members produced from coal combustion ash that are durable, non-polluting, fireproof and capable of being cut with a saw and of accepting screws and lag bolts and the like.

BRIEF DESCRIPTION OF THE DRAWINGS

FIG. 1(a) illustrates the use of posts and FIG. 1(b) illustrates the use of a crib;

DETAILED DESCRIPTION OF THE PREFERRED EMBODIMENTS

In accordance with the present invention, it has been discovered that when Class F fly ash and FBC ash from coal combustion are included together in a mortar mix, the blend of the two provides a surprising synergism wherein the Class F fly ash tends to reduce the undesirable swelling and durability reduction effects of the FBC ash, and the FBC ash tends to reduce the undesirable strength reduction effects of the Class F fly ash containing unburned carbon. Amounts of Class F fly ash and FBC ash that provide such synergism are referred to herein as "synergistic amounts" of such ashes. This invention permits coal combustion by-products to be used as the major part of a mortar mix that includes a mixture of Class F fly ash and FBC ash in amounts and proportions sufficient to neutralize the negative effects of the presence of unburned carbon in the Class F fly ash and the presence of sulfate in the FBC ash and which also includes a cementitious material. It has surprisingly been found that this advantageous effect is provided for mortars having a density of about 50 pounds per cubic foot (pcf) to about 100 pcf, and also for mortars having a density of about 20 pcf to about 50 pcf, but that the proportion of Class F fly ash-to-FBC ash is different for each of the two types of materials. In the 50 pcf–100 pcf mortar, for example, the weight ratio of Class F fly ash-to-FBC ash in the mortar mix is preferably over about 2:1, while in the 20 pcf–50 pcf mortar, the weight ratio of Class F fly ash-to-FBC ash in the mortar mix is preferably not over about 1:2.

Class F fly ash is defined as fly ash normally produced from burning anthracite or bituminous coal and which meets the ASTM (American Society of Testing and Materials) requirements for this class (ASTM C-618, Class F). The composition of typical Class F fly ashes from two different commercial coal burning power plants is shown in Table 1.

TABLE 1

Selected properties and composition of Class F fly ash from two commercial power plant sources.

| PARAMETER | UNITS | Power Plant "S" | Power Plant "A" |
| --- | --- | --- | --- |
| Mean particle size | mm | 0.022[a] | 0.028[c] |
| Bulk density | lbs/cu. ft. | 59.9 | 52.6 |

TABLE 1-continued

Selected properties and composition of Class F fly ash from two commercial power plant sources.

| PARAMETER | UNITS | Power Plant "S" | Power Plant "A" |
|---|---|---|---|
| Loss on ignition[d] | % by weight | 7.11 | 6.24 |
| $SiO_2$[b] | % by weight | 40.99 | 48.48 |
| $Al_2O_3$ | % by weight | 15.73 | 20.06 |
| $Fe_2O_3$ | % by weight | 22.15 | 17.63 |
| CaO | % by weight | 4.31 | 3.30 |
| $NaO_2$ | % by weight | 0.70 | 0.53 |
| MgO | % by weight | 0.57 | 0.48 |
| $SO_3$ | % by weight | 2.57 | 0.76 |
| $K_2O$ | % by weight | 3.43 | 2.11 |
| $Mn_2O_3$ | % by weight | 0.15 | 0.11 |
| $P_2O_5$ | % by weight | 1.21 | 0.28 |
| $TiO_2$ | % by weight | 1.08 | 1.02 |

Figure 3:
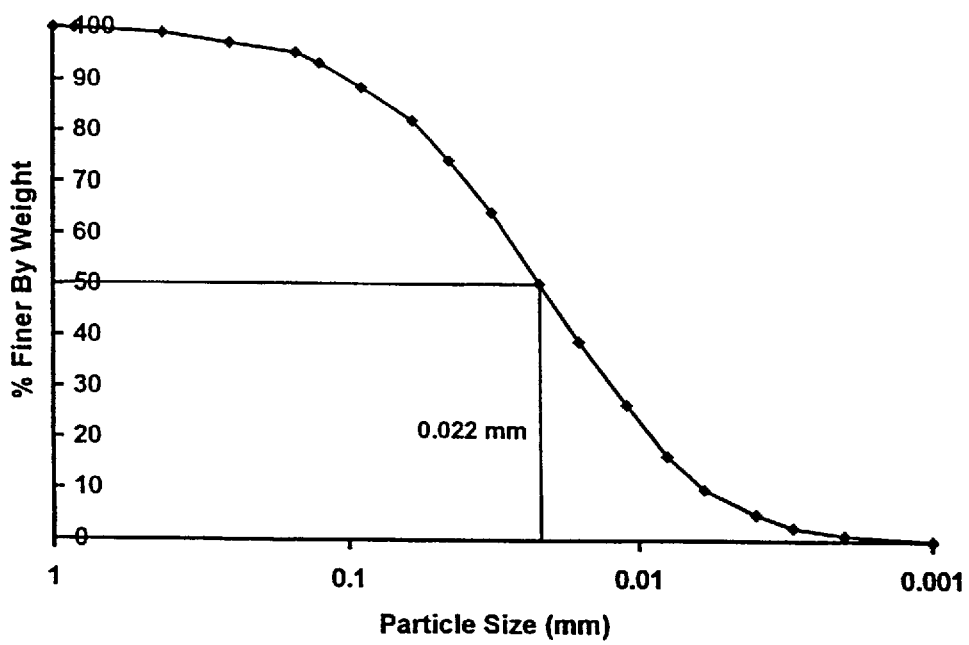
FIG. 3 shows a particle size distribution curve for Class F fly ash from Midwestern power Plant S.
Figure 4:
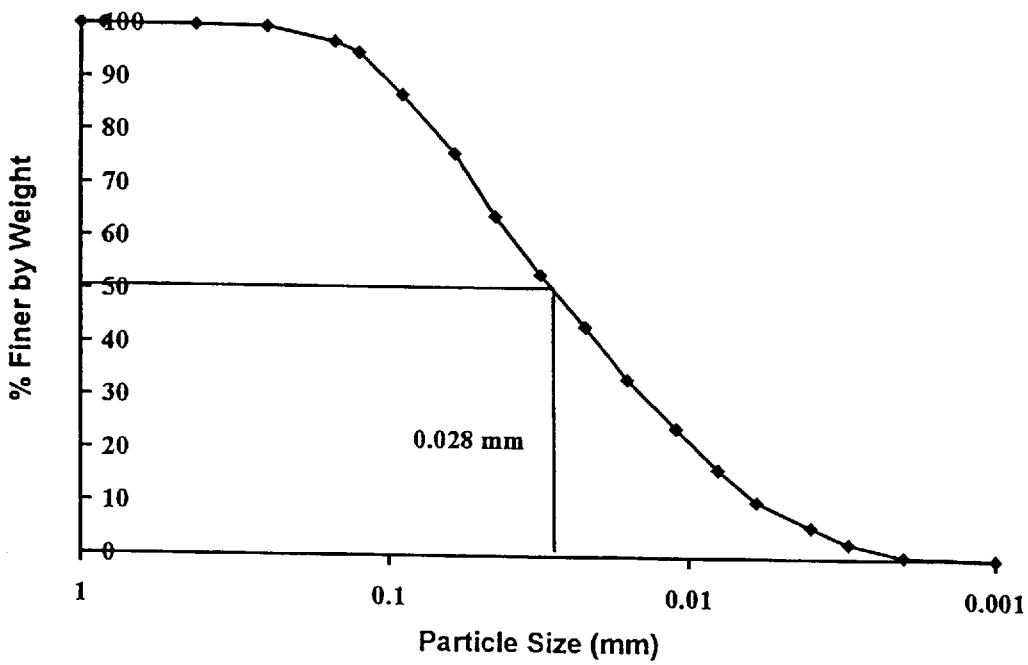
FIG. 4 shows a particle size distribution curve for Class F fly ash from Midwestern power Plant A.

Notes:
[a]The particle size distribution of this ash is shown in Figure 3.
[b]Oxides were determined by X-Ray Fluorescence analysis.
[c]The particle size distribution of this ash is shown in Figure 4.
[d]Loss on ignition value is indicative of the amount of unburned carbon in the ash.

Some Class F fly ashes are typically highly acidic when they are first mixed with water—reaching a pH of about 3. However, over a period of about 16 hours, the pH slowly increases to about 8.

Class F fly ash contains some amount of unburned carbon. The amount of unburned carbon in fly ash can be determined by measuring weight loss on ignition for the fly ash. It is preferred that the Class F fly ash that is useful in the present invention has a loss on ignition of less than about 10% by weight.

Class F fly ash typically has lower levels of calcium than, for example, Class C fly ash. It has been found to be preferred that the F fly ash that is useful in the present invention has a calcium content of less than about 10% by weight.

As long as the Class F fly ash is of the type that is useful in the subject mortar, it has been found that there is no need for further treatment or preparation of the ash prior to its use in the mortar.

Fluidized bed combustion ash that is useful in the present invention is typically produced by a fluidized bed combuster type of coal furnace. The unique composition of FBC ash is due in part to the typical practice of performing desulfurization inside the furnace by burning the coal in the presence of a calcium-containing material, such as limestone (calcium carbonate). The ash that is generated by the combustion is carried upward by a stream of rising hot gas and a major portion of the ash is conveyed out of the furnace with the exhaust gas. In the furnace, the calcium carbonate is oxidized to calcium oxide, some of which subsequently reacts with the sulfur from the coal to form calcium sulfate. The calcium sulfate, along with other non-volatile components of the coal and limestone, collects in the FBC ash.

Desulfurization processes that act upon hot gases as they exit the furnace can also produce ash that is useful in the present invention and, for the purposes of this invention, can be considered to be the equivalent of FBC ash. By way of example, the ash is produced by flue gas hot scrubbing processes is also useful as the FBC ash of the invention. In one typical hot scrubbing process, fine particles of lime or limestone are dispersed in water. This slurry is sprayed in fine droplets into a chamber through which the hot exhaust gases are flowing. The lime or limestone particles react with the sulfur compounds in the hot flue gas to form calcium sulfate that is deposited upon, or collected along with the fly ash from the scrubber.

Figure 5:
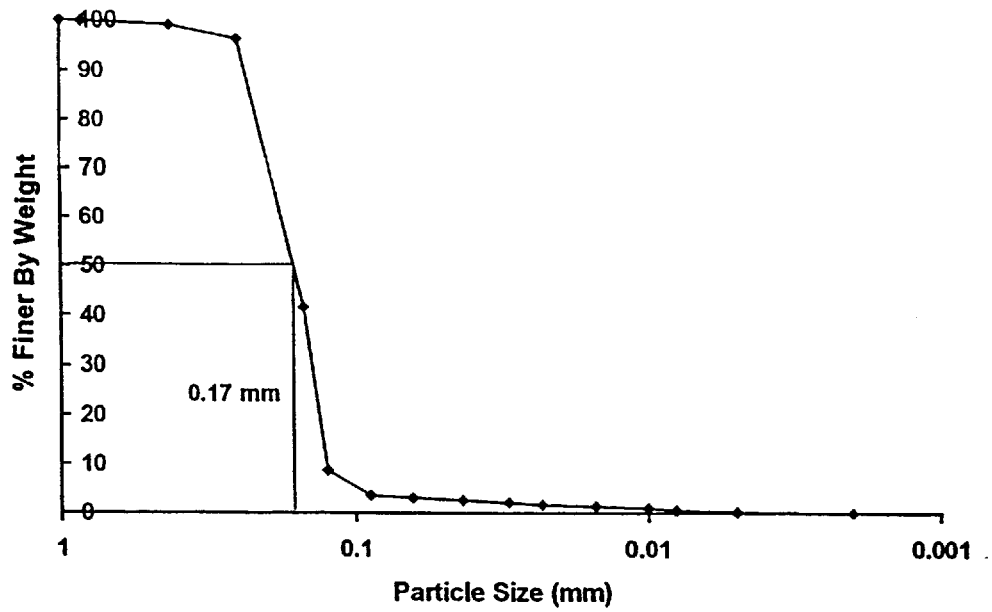
FIG. 5 shows a particle size distribution curve for fluidized bed combustion fly ash from Midwestern power Plant U.

Selected properties and components of an FBC fly ash that has been found to be useful in the subject invention are shown in Table 2. These values are provided by way of example only and it would be expected that other FBC ashes that would also be useful in the subject invention would have somewhat different properties and components. The particle size distribution of this FBC fly ash is shown in FIG. 5.

It is common for FBC ash to have higher levels of calcium than, for example, Class F fly ash, and it has been found to be preferred that the FBC ash that is used in the present invention have a level of calcium that is from about 8% to about 30% by weight, measured as calcium oxide.

TABLE 2

Properties of fluidized bed combustion fly ash from Power Plant "U".

| PARAMETER | UNITS | VALUE |
|---|---|---|
| Mean particle size[a] | mm | 0.17 |
| Bulk density | lbs/cu. ft. | 42.4 |
| Loss on Ignition | % by weight | 9.73 |
| $SiO_2$[b] | % by weight | 36.10 |
| $Al_2O_3$ | % by weight | 13.89 |
| $Fe_2O_3$ | % by weight | 11.08 |
| CaO | % by weight | 18.0 |
| $NaO_2$ | % by weight | 0.55 |
| MgO | % by weight | 0.43 |
| $SO_3$ | % by weight | 8.23 |
| $K_2O$ | % by weight | 1.44 |
| $Mn_2O_3$ | % by weight | 0.08 |
| $P_2O_5$ | % by weight | 0.40 |
| $TiO_2$ | % by weight | 0.40 |

Notes:
[a]The particle size distribution of this ash is shown in Figure 5.
[b]Oxides were determined by XRF analysis.

It has been found that ammonia may be liberated when some FBC ash or Class F-fly ash materials are mixed with water during the curing cycle. The inventors believe that ammonia causes the destruction of foam used for air entrapment and reduction of density of the mortar and this can lead to an increase in moisture content and introduction of surfactant chemicals into the mortar. The increase in moisture content has, on occasion, been observed to be on the order of 4% to 5%, rather than the usual 1% to 2% in the absence of ammonia. Since it is known that a moisture content in excess of about 32%–33% by weight can cause a significant reduction in compressive strength of the cured mortar, it is preferred that such liberation of ammonia during hydration of the FBC ash is to be avoided.

One method for preventing the introduction of ammonia into the mortar is to precondition the FBC ash prior to adding it to the mortar. The FBC ash can be preconditioned by mixing the FBC ash with water prior to adding the FBC ash to the other components of the subject mortar mix or mortar. It is preferred that FBC preconditioning be carried out by adding water to the FBC in an amount sufficient to complete the generation and release of ammonia from the FBC ash and convert anhydrite to gypsum. It is more preferred that water be added to the FBC ash in an amount equal to about 15% to about 20% of the weight of the FBC ash, and even more preferred that the water be added in an amount equal to about 16.5% of the weight of the FBC ash. It is even more preferred that the water be added slowly and in two stages to prevent the formation of clumps and that 75% of the water be added in a first stage with mixing and 25% of the water be added in a second stage with mixing. Since it is known that variation in the FBC fly ash composition results in varying water requirements for preconditioning, it is yet more preferred that water in an amount equal to about 12% by weight of the FBC ash be added in the first stage with mixing and that this water addition be followed by gradual addition of water until no further release of ammonia is detected. The amount of water necessary to precondition any FBC ash can easily be determined by carrying out a small-scale test in which the amount of water necessary to fully precondition a unit weight of the FBC ash is titrated into the ash. Following such a test, any amount of the FBC ash can then be preconditioned.

One example of a test for the determination of the amount of water required for successful preconditioning of FBC ash is as follows:

1. Add 1 kg of FBC fly ash to a small mixer;
2. Start the mixer at slow speed while simultaneously starting the slow addition of 100 ml of water. The water and ash should be allowed to mix thoroughly. The ash may initially form small clumps and generate heat due to hydration of free lime and with further mixing without addition of water and completion of hydration, the FBC would revert to its original powder form;
3. 10 ml aliquots of water should be added to the FBC, with each being allowed to intermix thoroughly before the addition of the next 10 ml aliquot. The mixer bowl should be monitored for generation of ammonia and heating;
4. The water addition should be stopped when no further heat is generated and/or no more ammonia is detected upon further addition of water;
5. The total amount of water added per kg of FBC ash can then be calculated. That amount will be considered to be the amount of water required for successful preconditioning of FBC ash.

It is well known that the components and even the physical characteristics of Class F fly ash and FBC ash from different sources and different coals can vary widely. The Class F fly ashes of Power Plant "S" and Power Plant "A", that are described above are provided by way of example only and are not to be interpreted as limiting. Other Class F fly ashes and FBC ashes that mainly fall within these broad classifications can also be used in the present invention. The inventors do not believe that either Class F fly ash or FBC ash must conform exactly to the ASTM requirements defining such classes, but believe that ashes that largely conform to the ASTM definitions, but deviate in certain respects, can also be advantageously used.

The cementitious material that is useful in the present invention can be ordinary portland cement, or can be some alternative cement-like material, such as the fines, or dust from cement kilns. Alternative cementitious materials that would be suitable for use in the present invention are well known in the art and could be easily selected by one having skill in the art of compounding cements.

In some instances it has been found useful to add a blended cement to the mortar mix or to the mortar in order to enhance certain properties of the curing process or the cured structural material that results. Several examples of commercially available blended cements that may be useful in the present invention are duracal, gypsum, Type III cement, and hydrocal. Further description of the use of blended cements, in general, may be found in Frohnsdorff, G., *Blended Cements*, STP 897, American Society for Testing and Materials, Philadelphia (1986); and in the *Guide to the Selection of and Use of Blended Cements*, American Concrete Institute, ACI 225R-85, ACI Committee Report; and in Lea, F. M., *The Chemistry of Cement and Concrete*, Chemical Publishing Co., Inc., 3rd Ed., New York, (1971).

The strength and failure characteristics of the cured mortar and structural members of the present invention can be significantly improved by the presence of a preferred amount of certain fibers. The fibers that are useful in the subject mortar mix, mortar and structural members can be natural or synthetic fibers. Natural fibers have been found to be useful in the ultra-lightweight mortar (20 pf–50 pcf), while synthetic fibers have been found to be useful in either the ultra-lightweight or the lightweight (50 pcf to 100 pcf) mortars. Some types of natural fibers that can be used in the subject invention are cellulose, wool, cotton, hair, hemp, ramie and the like. Some types of synthetic fibers that can be used include metal, carbon, boron, and polymeric fibers. Glass fibers, on the other hand, have not been shown to be useful in the subject invention. When fibers are added to a mortar or a mortar mix, only one type of fiber can be used, or a blend of several types of fibers can be used.

When synthetic fibers are used, it has been found to be preferred that the fibers are selected from the group consisting of fibers of nylon, polypropylene, and polyester. Polyester fibers are more preferred and polyester fibers comprising fibers of at least two different lengths are even more preferred. In particular, a blend of polyester fibers having lengths of 0.75 in. and 1.5 in. in equal proportion has been found to provide excellent performance, especially when the fibers are waste fibers from carpet manufacturing that have a longitudinally twisted aspect.

The density of the subject mortar can be reduced by the addition to the mortar of a density reducer. As used herein, the phrase "density reducer" refers to any material that, when incorporated into the mortar mix, results in a mortar having a density lower would have resulted had the mortar mix not included the material. Any material that is conventionally used to lower the density of concrete can be used in the present application as a density reducer. Air entrainment chemicals—such as surfactant liquids, micro-bubble foam materials, rigid foam beads, and the like are all suitable for use with the subject mortar. For additional general information about the use of density reducers in cements and mortars, see, e.g., Kosmatka, S. H. and W. C. Panarese, *Design and control of concrete mixtures*, Portland Cement Assn., 13th Ed., (1988).

In the present invention, it has been found to be preferred to use a surfactant liquid as the density reducer. Several examples of suitable surfactant liquids are materials having the trade names of Mearl® Liquid and Rheocell® 15.

The subject mortar mix can be prepared by mixing together as a major part, a blend of Class F fly ash and fluidized bed combustion (FBC) ash wherein the Class F fly ash and the FBC ash are present in amounts and proportions sufficient to reduce the negative effects of the presence of unburned carbon in the Class F fly ash and the presence of sulfate in the FBC ash and which mortar mix also includes, as a minor part, a cementitious material. As mentioned above, the ratio of the Class F fly ash-to-FBC ash has been found to fall into two broad, but distinct, categories depending upon the desired density of the finished mortar. As used herein, a mortar having a density of about 20 pcf to about 50 pcf, is referred to as a "low density", or "ultra-lightweight" mortar, and a mortar having a density of about 50 pcf to about 100 pcf is referred to as a "lightweight" mortar, because even mortars having a density of, for example, 100 pcf, are considered to be lower density mortars than normally encountered in standard cements.

When the term "mortar mix" is used herein, what is referred to is a mix or blend of dry, or substantially dry, materials. Or, if some moisture is present, the mortar mix is in the form of solid particles that are at least sufficiently dry to be flowable. When the term "mortar" is used herein, what is referred to is the mortar mix to which water has been added and which has not yet cured. When the mortar of the present invention is cured, it is referred to herein as the "cured product" of the mortar, or the "cured mortar".

When a mortar having a density of 50 pcf to about 100 pcf is required, it is preferred that the Class F fly ash-to-FBC ash weight ratio in the mortar mix is at least about 2:1. It is more preferred that this mortar mix comprise about 50% to about 85% by weight Class F fly-ash and about 1% to about 20% by weight fluidized bed combustion (FBC) ash; and about 5% to about 30% by weight cementitious material; and even more preferred that it comprise about 50% to about 75% by weight Class F fly-ash and about 5% to about 15% by weight FBC ash; and about 20% to about 30% by weight cementitious material. For applications where the strength or the rate of cure of the resulting mortar is important, a blended cement can be used to replace a portion of the cementitious material in an amount of about 1% to about 3% by weight of the mortar mix.

When an ultra-lightweight mortar is desired, it is preferred that the Class F fly ash-to-FBC ash weight ratio in the mortar mix is not over about 1:2. It is more preferred that this mortar mix comprise about 10% to about 25% by weight Class F fly-ash and about 50% to about 85% by weight fluidized bed combustion (FBC) ash; and about 5% to about 30% by weight cementitious material; and even more preferred that it comprise about 10% to about 25% by weight class F fly-ash and about 60% to about 80% by weight FBC ash; and about 10% to about 20% by weight cementitious material. For applications where the strength or rate of cure of the resulting mortar is important, a blended cement can be used to replace a portion of the cementitious material in an amount of about 1% to about 5% by weight of the mortar mix.

It has been found that the strength and failure characteristics of the structural composition comprising the cured mortar mix can be improved if certain types of fibers are added to the mortar or the mortar mix. A sufficient amount of fibers should be added to the mortar mix or to the mortar to enhance the strength of the cured product of the mortar. The preferred amount of fibers has been found to be about 0.5% to about 1.5% of fibers by volume of the mortar mix. By way of example, if the volume of the mortar mix is 10 cubic feet, then it is preferred that from about 0.05 cu ft. to about 0.15 cu ft. of fibers be added. The fibers can either be added to the dry mortar mix, or they can be added to the mortar mix at the same time that water is added to make up the mortar.

Figure 6:
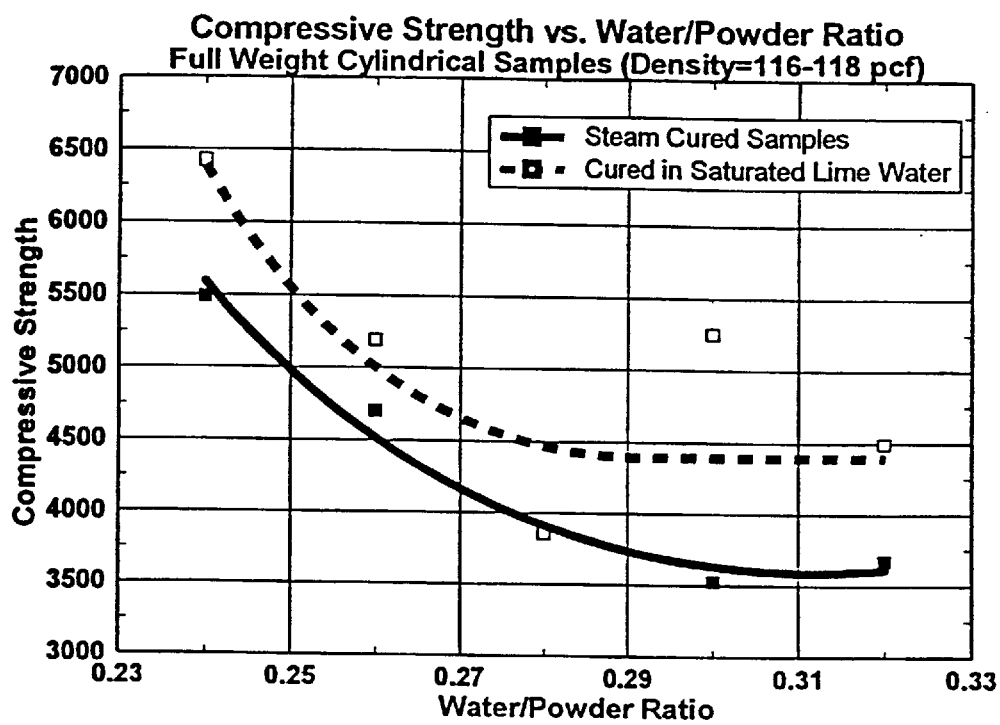
FIG. 6 shows the effect of water-to-dry powder ratio on the compressive strength of the subject mortar without the presence of density reducers.

A mortar can be produced from the subject mortar mix by the addition of water to the mortar mix, with mixing. The amount of water is sufficient to permit intermixing of the components of the mortar into a homogeneous mixture that is sufficiently workable or flowable that it can be formed into the shape desired for curing while retaining good strength characteristics in the cured mortar. Water can be added to the mortar mix in an amount that provides desirable flow and strength properties. These desirable properties are usually obtained when water is added in an amount of from about 20 parts to about 60 parts by weight water per 100 parts of the mortar mix. However, the preferred amount of water is from about 22 parts to about 35 parts by weight water per 100 parts of mortar mix. FIG. 6 shows how the compressive strength of the subject mortar (here with a density of about 116–118 pcf because of the lack of density reducers) varies as a function of the amount of water added prior to curing.

As indicated in the figure, as more water is added to the mix—and the mortar becomes more workable and flowable—compressive strength is reduced. Therefore, the amount of water that is used must be determined on the basis of the balance of workability and strength characteristics required in the cured mortar.

Since the properties of the coal combustion ashes that are used to produce the subject mortar mix can vary significantly, it is sometimes desirable to determine the optimum amount of water that is needed for a particular batch of mortar mix, and for a particular application, by carrying out a simple test can consist of, for example, producing test cylinders of several mortars from the mix, each with a different water level within the general range of from 22 parts to 35 parts by weight of water per 100 parts of mortar mix. After the test samples have cured, their strength can be tested by standard methods for selection of the optimum water level that is required for the particular mortar mix that is available and the particular application that is contemplated. This selection is easily done by one having skill in the art of production and use of cement-based mortars.

Production of the mortar mix and of the mortar can be carried out in any equipment that is suitable, respectively, for the production of dry blends of, for example, blended cements, and the production of mortars from those dry blends. Thus, ordinary cement mixers are suitable for performing the task.

It may be desirable to add other materials to the subject mortar, such as chemicals that speed up or slow down the curing rate of the mortar, colorants, pigments, binders, emulsifiers, and the like. These materials can be added to the dry mix, or during the process of mixing the mortar, according to the preferred practice for the particular additive.

When density reducers are added to the mortar they can be either added directly to the mortar mix with water, followed by foam generation by aeration and/or mixing; or, they may be used to generate foam by mixing with water under pressure (i.e., 20–25 psi) to form a foam, followed by incorporation of the foam into the mortar mix, with additional water if needed, taking care not to deflate the foam. The latter method is preferred, since it results in a greater foam volume per unit of density reducer material. A sufficient amount of density reducer is added to the mortar depending upon whether ultra-lightweight (20 pcf–50 pcf), or lightweight (50 pcf–100 pcf) mortar is desired.

The mortar of the present invention can be poured or pumped into any above-ground or below-ground location and can then be cured in place. When the subject mortar is used in this fashion it can act as a stabilizer to fill voids, create a stable base or sub-base for construction, or as a cement-like material to seal mine chambers, or the like.

The subject mortar can be used to produce a coal combustion by-product-based structural member from any of the mortars as described above; molding the mortar into a desired shape; and curing the molded mortar into a structural member. Depending upon whether the ultra-lightweight or the lightweight mortar is used, the structural member will have a density, respectively, of about 20 pcf to about 50 pcf, or about 50 pcf to about 100 pcf.

It has been found that either disposable molds or reusable molds can be used to conform the mortar into the shape of the desired structural member. Reusable molds are those that can be reused several times for the formation and curing of the desired structural member. Reusable molds are commonly made of metal that is sufficiently heavy as to permit repeated assembly and disassembly without destruction.

Figure 2:
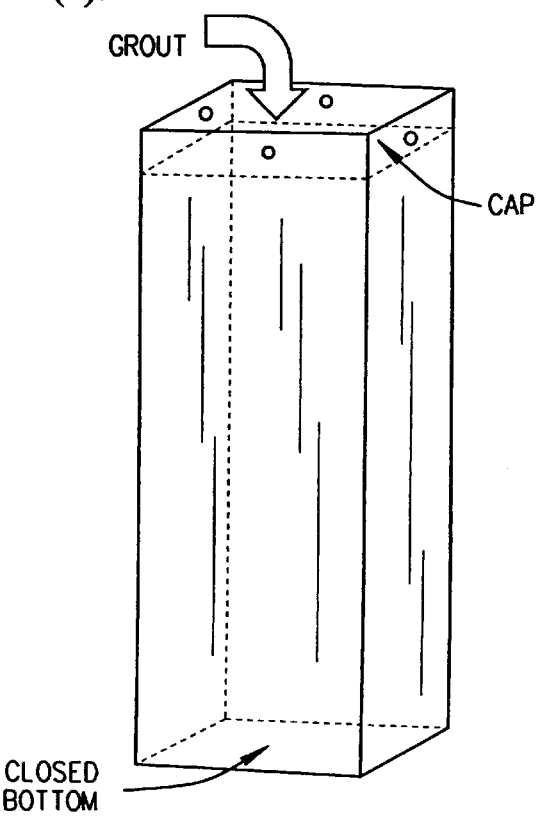
FIG. 2 shows one embodiment of a disposable mold that can be filled with the subject mortar, which is then cured to produce a structural support member.
Figure 11A:
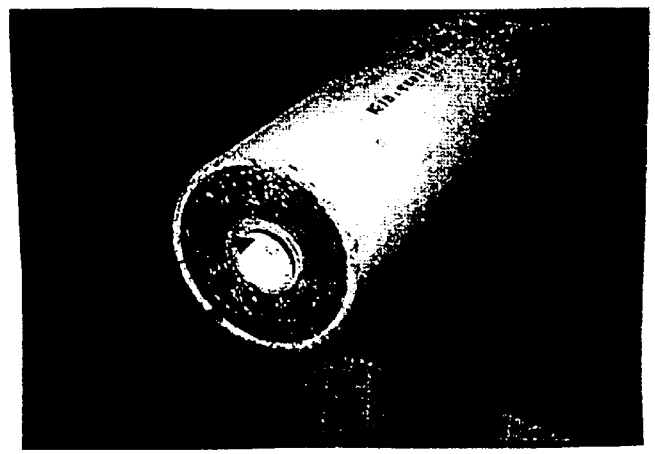
FIGS. 11(a), (b) and (c) illustrate one embodiment of a structural member comprising inner and outer PVC pipe molds with the annular space filled with the cured coal combustion-based structural material, wherein (a) is a photograph of one end of a structural member showing the cross-section, (b) is a photograph showing typical buckling behavior of the member during a destructive compression test, and (c) is a plot of the stress—strain behavior for each of two six-foot-long PVC encased hollow posts during such a compression test.

Disposable molds, on the other hand, are used only one time and are commonly not removed from the structural member after it has been cured. Disposable molds are often made of lighter-weight materials than reusable molds and may be less expensive. These molds can be made of polymeric material, such as plastic pipe or channel, or from metal, such as sheet metal, for example. Polyethylene pipe, PVC pipe and galvanized sheet metal have been found to be preferred materials for the construction of disposable molds. One configuration of a disposable mold suitable for the formation of a support member having a substantially square cross-section is shown in FIG. 2. Alternatively, the molds can have cross-sections that are rectangular, circular, annular, and/or of any polygon having at least three sides, and can be solid, hollow, or with two or more channels running longitudinally through the member. A particularly preferred support member having a disposable mold can be formed when the mold is an annular mold having the cross-section shown, for example, in FIG. 11(a). PVC pipe has been found to provide structural members having superior performance characteristics when used as the disposable mold in the formation of members having a circular, annular cross-section.

The subject mortar can be added to the mold in any fashion that is conventionally used for such purposes. It is preferred that some form of void removal be administered to the molded mortar to eliminate or reduce the number and size of void in the mortar as it is placed in the mold. However, the void reduction method must be of the type that can help coalesce and remove larger voids while avoiding the collapse of the smaller bubbles of the foam. While any type of void collapse or removal can be used, the application of vibration to the filled mold has been found to successfully remove voids in the molds upon mortar placement. The vibration can be either of low frequency/high amplitude, or can be of high frequency/low amplitude. However, it is preferred that the vibration be sufficient only to remove larger voids while avoiding the collapse of the foam created by the density reducer material.

The molded structural members can be cured by any normal method, including simply allowing the molded structural member to sit at ambient temperature and pressure until the mortar has cured sufficiently to permit moving and/or use of the member. The member can be either cured in the mold or can be unmolded and cured outside of the mold. If disposable molds are used, then the member is cured without removing the mold.

It has been found to be preferable, however, to control the temperature and humidity surrounding the mortar as it cures. Exposure of the molded mortar to high relative humidity for a time, followed by a period of immersion in hot water has been found to achieve 90% of the normal 28-day strength of the cured mortar within about 2–4 days. Such rapid curing is advantageous when it is important to minimize the amount of inventory of structural members in the production facility and, thus, to minimize the cost of the members.

A preferred curing sequence is exposure of the molded member to high humidity (i.e., 85%–100% RH) at room temperature for about 8 to about 24 hours, followed by removal of the molds (if reusable molds are used) and then either immersing the member in hot water (i.e. a temperature of about 150° F. to about 170° F.) for about 24 to about 48 hours, or exposing the member to steam at atmospheric pressure for about 24 to about 48 hours, followed by slow cooling to room temperature in about 20 to about 30 hours. As used herein, reference to "high relative humidity" refers to a relative humidity of 85%–100%.

An alternative curing sequence that has also been found to be preferred is the exposure of the molded member to high humidity at a temperature of about 90° F. to about 120° F. for about 8 to about 24 hours, followed by removal of the mold (if reusable molds are being used) and then either immersing the member in hot water (i.e. a temperature of about 150° F. to about 170° F.) for about 24 to about 48 hours, or exposing the member to steam at atmospheric pressure for about 24 to about 48 hours, followed by slow cooling to room temperature in about 20 to about 30 hours.

In either of the two curing methods described above, the hot water may be saturated with lime to minimize leaching of lime, or similar materials, from the mortar during curing.

When the structural members are formed in disposable molds, either of the two curing cycles described above can be used, but the molds are not removed from the members and all curing is done in the molds.

A durable, strong and non-flammable structural composition is obtained as the cured product of the subject mortar. If the ultra-lightweight formulation of the mortar is used, the structural composition typically has a density of about 20 pcf to about 50 pcf, and it is preferred that this structural composition has a compressive strength (as measured on 3-inch cubes by standard compressive strength measuring techniques that are well-known in the industry) of at least about 100 psi; more preferably of at least about 300 psi; and even more preferably of at least about 700 psi.

When the subject lightweight mortar is used, the structural composition typically has a density of about 50 pcf to about 100 pcf, and it is preferred that this structural composition has a compressive strength on 3-inch cubes of at least about 600 psi; more preferably of at least about 1,500 psi; and ever more preferably of at least about 2,800 psi.

Figure 1A:
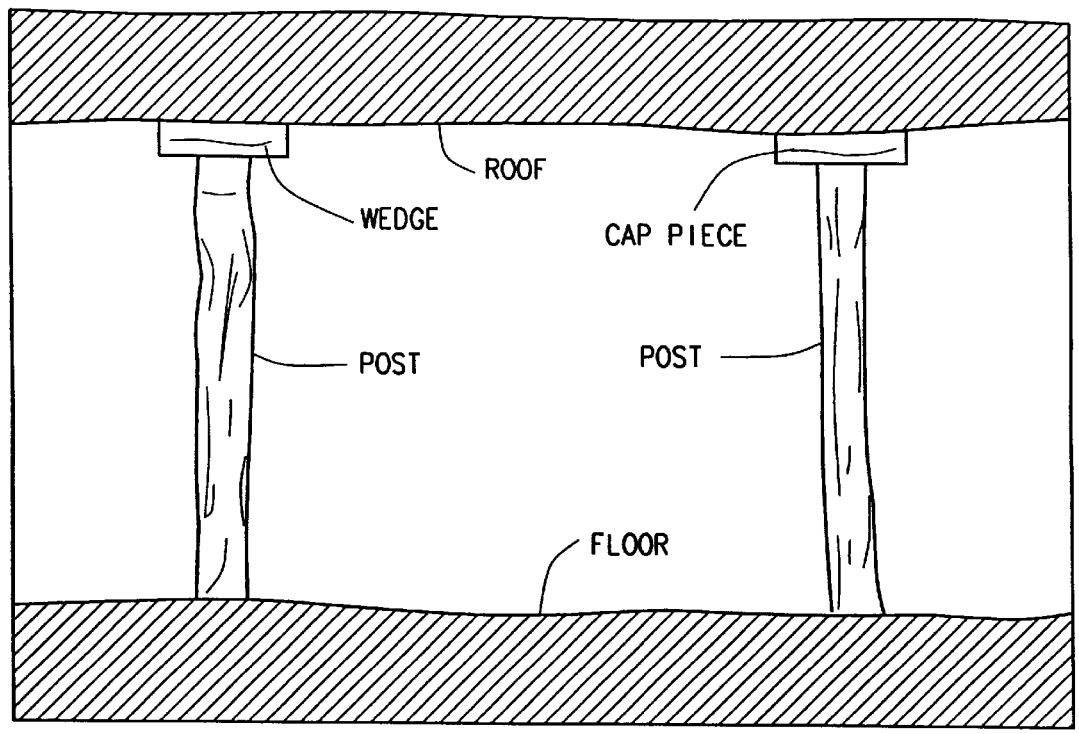
FIGS. 1(a) and (b) shows typical use of structural support members in a mine, where
Figure 1B:
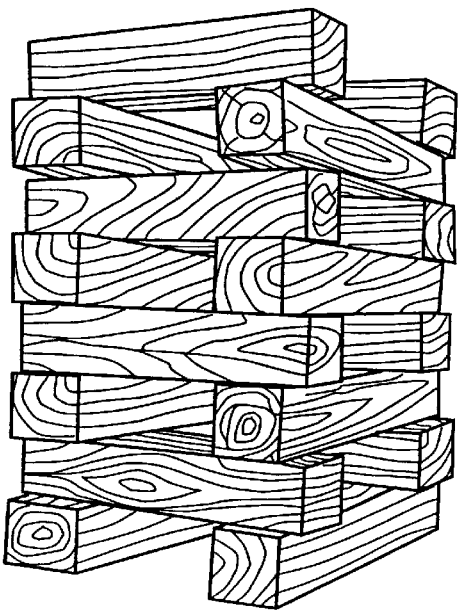

It has been found that the structural members that can be produced from the subject mortar are particularly useful as support members for use in underground mines. See FIG. 1 for an illustration of how structural support members are typically used in mines to form (a) posts and (b) cribs. Crib members and support posts, for example, have been produced from the novel mortar that provide a strength-to-weight ratio that is at least comparable to, and is preferably higher than that of wood. By way of example, the annular support post shown in FIG. 11 has been shown to provide superior weight bearing capacity per unit weight.

The subject structural support members can be used to support the ceilings of underground mines and for similar support applications by interposing a post and/or crib unit between the mine floor and the mine ceiling. However, the novel support members are not limited for use in mines, but can be used for almost any support application that is now performed by wooden or metal support members. The subject support members have several advantages for such uses, among them are that they are non-flammable; they have strength-to-weight ratios that are comparable to, and in many cases superior to, that of wood; they are not subject to the same cyclic availability as wood; and they are durable over long periods of time. Furthermore, because they are environmentally stable and relatively inexpensive they can be left in the mine without fear of causing pollution.

The following examples describe preferred embodiments of the invention. Other embodiments with the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example illustrates the compressive strength of the novel mortar at various levels of Class F fly ash, FBC ash, cement and water.

A 12-point distance optimized based statistical design with six replications of each mix was used for optimizing the amounts of Class F fly ash, FBC ash and cement to be used in the mortar mix along with the water: dry materials ratio. The range of testing was: cement: 32%–37% by weight of dry materials; FBC fly ash: 7% to 15% by weight of dry materials; Class F fly ash: 49% to 59% by weight of dry materials; and 29% to 37% for water to dry powder ratio.

Samples of each of the ingredients of the dry mortar mix were subjected to X-ray fluorescence for the determination of their elemental analysis and observed ranges of chemical composition. The compositions are reported in Table 3 in terms of the respective oxides.

TABLE 3

Elemental composition of Class F fly ash, FBC ash and cement by X-ray Fluorescence spectroscopy as reported by oxides.

| Constituent | FBC fly ash[b] | Class F fly ash[c] | Cement |
|---|---|---|---|
| $Na_2O$ | 0.40–1.4 | 0.33–0.65 | 0.09 |
| MgO | 1.8–4.5 | 0.91–1.1 | 3.30–4.25 |
| $Al_2O_3$ | 7.9–17.3 | 28.5–29.2 | 4.26–4.61 |
| $SiO_2$ | 21.8–35.4 | 51.3–52.4 | 21.23–21.95 |
| $SO_3$ | 9.8–12.6 | 0.39–0.59 | 2.57–2.94 |
| Chloride | 0.057–0.1 | 0.0027–0.0042 | n/a[a] |
| $K_2O$ | 0.99–1.6 | 2.1–2.4 | 0.48–0.76 |
| CaO | 23.6–35.5 | 1.4–1.6 | 61.93–62.90 |
| $TiO_2$ | 0.26–0.51 | 0.89–1 | n/a |
| $V_2O_5$ | 0.0027–0.0055 | 0.031–0.36 | n/a |
| $Cr_2O_3$ | n/a | 0.014–0.027 | n/a |
| MnO | 0.038 | n/a–0.0038 | n/a |
| $Fe_2O_3$ | 3.7–4.8 | 5.6–6.5 | 2.94–3.27 |

Notes:
[a] n/a indicates that the data was not available
[b] It was observed that the FBC fly ash had a lime content of 35.5% and an $SO_3$ content of 12.6%, which was very high.
[c] The Class F fly ash had a loss-on-ignition value of 9.2% by weight.

Samples of mortar were prepared with compositions that varied according to the experimental matrix as shown in Table 4. Six samples of each of the experimental mixes shown in Table 4 were formed into 3"×6" cylinders, cured for 24 hours at 85%–90% relative humidity; then immersed in hot water (150° F.–170° F.) for 24 hours; and then allowed to stand in air at room temperature for 24 hours. Each sample was then tested for compressive strength by ASTM standard methods. The results of the tests for compressive strength are shown in Table 5.

TABLE 4

Experimental matrix for mix optimization.

| Mix number | Cement as % of dry powder | Class F fly ash as % of dry powder | FBC fly ash as % of dry powder | Water as % of Water/Dry powder Mix |
|---|---|---|---|---|
| 1 | 34.44 | 58.41 | 7.15 | 32.45 |
| 2 | 34.67 | 54.59 | 10.74 | 32.78 |
| 3 | 33.97 | 58.63 | 7.40 | 36.99 |
| 4 | 32.00 | 56.90 | 11.10 | 29.03 |
| 5 | 36.07 | 49.34 | 14.59 | 32.63 |
| 6 | 35.62 | 50.96 | 13.42 | 36.99 |
| 7 | 33.55 | 52.26 | 14.19 | 29.03 |
| 8 | 32.96 | 52.43 | 14.62 | 32.89 |
| 9 | 35.10 | 50.71 | 14.19 | 29.03 |
| 10 | 33.97 | 50.96 | 15.07 | 36.99 |
| 11 | 37.26 | 55.34 | 7.40 | 36.99 |
| 12 | 35.28 | 57.20 | 7.52 | 29.70 |

TABLE 5

Unconfined compressive strengths for mortars of the experimental mixes (density of 90 lbs/cu ft).

| Mix No. | Std. Deviation, ρ (pcf) | Average $C_o$ (psi) | Std. Deviation, $C_o$ (psi) |
|---|---|---|---|
| 1 | 0.38 | 2765 | 199 |
| 2 | 0.26 | 3374 | 188 |
| 3 | 0.47 | 2733 | 197 |
| 4 | 0.41 | 3371 | 177 |
| 5 | 0.4 | 3032 | 421 |
| 6 | 0.65 | 3240 | 102 |
| 7 | 0.22 | 3126 | 297 |
| 8 | 1.04 | 3616 | 438 |
| 9 | 0.21 | 3123 | 245 |
| 10 | 0.82 | 3424 | 340 |
| 11 | 0.38 | 2127 | 475 |
| 12 | 0.52 | 3214 | 329 |

The results of the tests indicated that the water-to-powder ratio was the most important factor determining the compressive strength of the cured mortar. The optimality of a mix was based on: 1) adequate compressive strength for weight equivalent to that of a timber support, and 2) cost of manufacturing is competitive with wooden supports.

EXAMPLE 2

This example illustrates the effect of the water:dry powder ratio and the presence of fibers on compressive strength of the cured mortar.

Samples of the novel mortar were prepared with a dry mix composition of Class F fly ash (55% by weight); preconditioned FBC fly ash (10% by weight); and ordinary Portland cement (35% by weight). Polyester fiber having a staple length of approximately 1.5 inch was added to each of the mixes in an amount of 0.75% by volume of the dry mix. No density reducers were used in the mortar, thus the cured mortar had a density of about 115–118 pcf. The amount of water that was added to the dry mortar mix was varied from 24% to 32% by weight of the dry mortar mix (including fibers). Since polyester fibers do not absorb water, the results from the test can be used to isolate the effect of the water:dry powder ratio. A sample of the mortar at each level of added water was cured by using the atmospheric steam curing method and another sample was cured by using a lime-saturated hot water curing method, both of which methods are described previously. All samples were cured for two days before testing for unconfined compressive strength. The steam cured samples were placed in an atmosphere of saturated steam at ambient pressure for two days and the lime-saturated hot water cured samples were placed in lime-saturated water at 170° F. for two days. The results of the tests for compressive strength are shown in Table 6 and the same results are plotted in FIG. 6.

TABLE 6

Unconfined compressive strength of cured mortars made with various water-to-dry powder ratios.

| Water (as % by weight of total dry powder) | Density (pcf) | Curing Method | Average Compressive Strength, $C_o$ (psi) |
|---|---|---|---|
| 24 | 119 | Steam | 5490 |
| 24 | 120 | Lime HW | 6420 |
| 26 | 118 | Steam | 4700 |

TABLE 6-continued

Unconfined compressive strength of cured mortars made with various water-to-dry powder ratios.

| Water (as % by weight of total dry powder) | Density (pcf) | Curing Method | Average Compressive Strength, $C_o$ (psi) |
|---|---|---|---|
| 26 | 118 | Lime HW | 5190 |
| 28 | 117 | Steam | 3880 |
| 28 | 116 | Lime HW | 3850 |
| 30 | 115 | Steam | 3525 |
| 30 | 114 | Lime HW | 5250 |
| 32 | 116 | Steam | 3672 |
| 32 | 114 | Lime HW | 4490 |

The results of the experiment indicate an inverse relationship between unconfined compressive strength and water-to-dry powder ratio. As shown in FIG. 6, the relationship tends to become asymtotic to increase in water at a water level of about 0.30 parts water per part dry powder, or above. A significant gain in compressive strength is observed for water-to-powder ratios of less than 0.28, however, the mix tends to lose its workability because of increased stiffness which, in commercial production, could lead to undesirable air entrapment within the mortar during the molding process. Thus, it is shown that some level of water:dry power will provide an optimum combination of strength to workability that may be dependent upon the application proposed for the mortar.

EXAMPLE 3

This example illustrates the effect of elevated temperature curing upon compressive strenght and elastic modulus of the novel mortar.

The effect of two potential elevated temperature curing cycles upon the compressive strenght and elastic modulus of the novel mortar were determined. In order to minimize the amount of thermal strsses that temperature rise during curing has upon the mortar, it was decided to test a hot water (170° F.) curing cycle versus an ambient pressure steam curing cycle. It was believed that hot water curing would permit better control of temperature within the structural member steam curing. Samples were prepared from a mortar comprising 55% by weight Class F fly ash, 10% by weight preconditioned FBC ash, 35% by weight ordinary Portland cement, and with 28% water by total weight of dry powder. The results of the strength and deformation properties of the sample mortars are shown in Table 7.

TABLE 7

Comparison of strength and deformation properties of 3-day steam cured mortar versus hot water cured mortar.

| Sample | Density | Curing Method | Compressive Strength (psi) | Elastic Modulus ($\times 10^5$ psi) |
|---|---|---|---|---|
| 1 | 97 | 1-day hot water | 2991 | 6.1 |
| 2 | 97 | " | 2986 | 6.3 |
| 3 | 97 | 2-day hot water | 3108 | 6.3 |
| 4 | 97 | " | 3108 | 6.8 |
| 5 | 98 | 3-day hot water | 3053 | 6.9 |
| 6 | 97 | " | 3032 | 6.9 |
| 7 | 93 | 3-day steam curing | 3154 | 6.9 |
| 8 | 94 | 3-day steam curing | 3768 | 7.0 |

It is noted in Table 7 that the density of the hot water cured samples is higher than for the steam cured samples. It is believed that this was caused by excess moisture within the sample following the curing process that would be eventually lost by drying and does not effect the strength of the samples. The data suggest that the same strength obtained by 3-day steam cure can be obtained in 1 to 2-day hot water curing. The product quality from hot water curing also appears to be more uniform. The inventors believe that hot water curing has the following advantages over steam curing, namely: 1) easier implementation in commercial practice, 2) lower capital cost for curing chambers, and 3) decreased production time and lower product inventory due to the need for lower curing time and smaller curing chambers.

EXAMPLE 4

This illustrates the superior compressive strength of coal-combustion-byproduct based crib members over wooden crib members.

Figure 7:
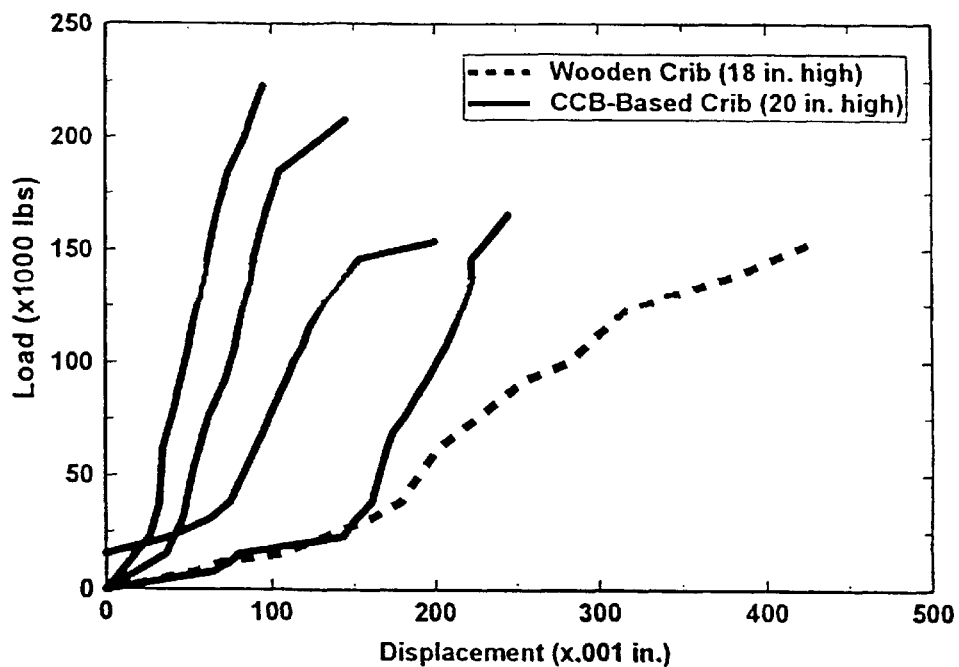
FIG. 7 shows the load supporting versus displacement characteristics of cribs of the subject coal-combustion-based structural members as measured in the laboratory.

A total of four cribs, each composed of eight 5"×5"×23.5" crib members were produced from the mortar mix as described by the method disclosed in Example 3, with hot-water-immersion curing. Another crib was built from commercial 2'-long wooden crib members. Each crib was tested in a 200 ton Material Testing Services, Inc. (MTS) machine (Material Testing Services, Inc., Minneapolis, Minn.) under constant loading rate (42.5 psi/min) to compare the performance of the CCB-based cribs versus the wooden crib. Two CCB-based cribs had interspersed members of varying density from 80 pcf to 100 pcf to evaluate the impact of varying density upon compressive strength. The load-deformation characteristics of all four CCB-based cribs and the wooden crib are shown in FIG. 7. The load-deformation results indicate the CCB-based cribs were superior to the wooden crib in terms of stiffness and load bearing capacity even with interspersed lower-density crib members.

EXAMPLE 5

This illustrates the superior load-bearing capacity of CCB-based short posts over wooden posts.

Wooden post members that were typical of those being used for vertical support posts in mines were obtained and cut to 24" length. The wooden posts were 8" square. CCB-based post segments that also had a length of 24" were produced from the novel mortar by the same method as describe in Example 4. The CCB-based post segments were 6"×6" square and had the same weight as the wooden posts.

Figure 8:
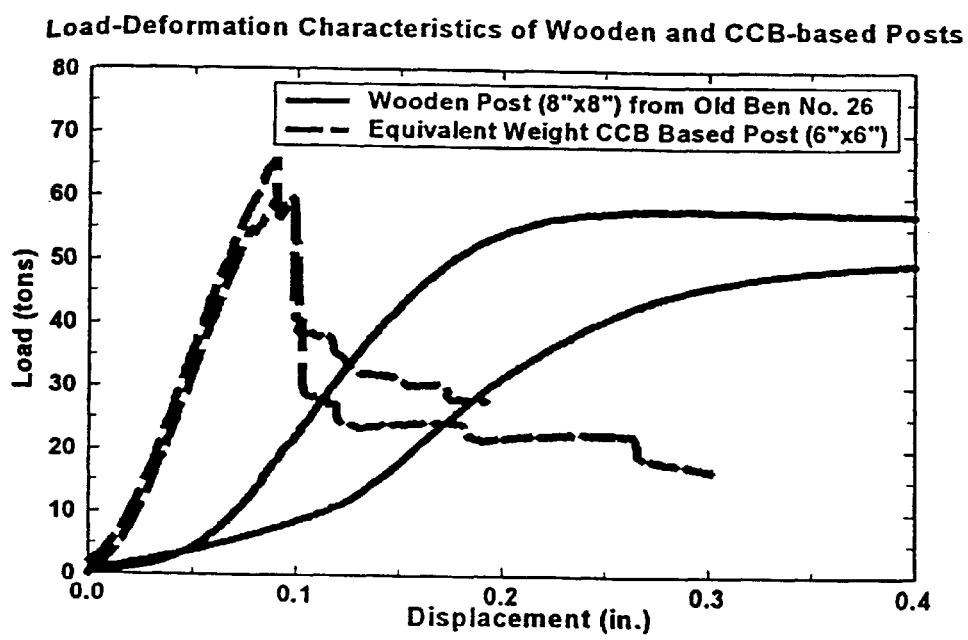
FIG. 8 shows the load supporting versus displacement characteristics of 24" posts of the subject coal-combustion-based structural material as compared with wooden posts having the same weight, as measured in the laboratory.

Samples of all posts were tested in a 600,000 lb. MTS stiff testing machine for load versus displacement under constant displacement control mode. The average maximum load capacity (for two samples) for the wooden posts was 65 tons, while the average maximum load capacity (for six samples) for the CCB-based posts was 68 tons. A plot of the load versus displacement response for the wooden and CCB-based posts is shown in FIG. 8. It can be seen that the CCB-based post segments had superior load bearing capacity per unit weight compared with the wooden posts and that the CCB-based posts were stiffer than their wooden counterparts.

EXAMPLE 6

This illustrates the superior performance of CCB-based post and crib materials in commercial mine applications.

Full-sized support posts were produced from coal combustion byproduct materials by the method described in Example 4. Each post was 72" in length, 5"×5" in cross-section and with a density of 90 pcf. Crib members were produced from the same type members, but the crib members were of shorter length and had densities of about 80–85 lb/cu ft. The CCB-based support posts and crib members were installed in commercial mines under standard conditions and fitted with load cells for measuring the load on the support. Similar wooden posts and cribs were installed in similar locations and instrumented similarly.

Figure 9:
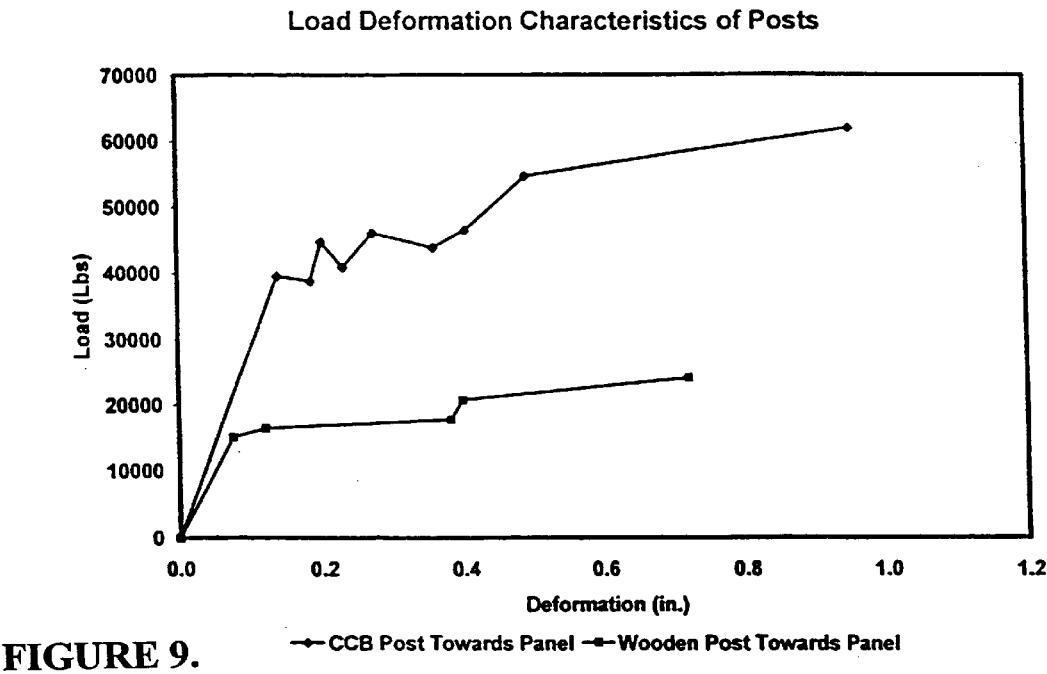
FIG. 9 shows the load supporting versus displacement characteristics of 72" posts of the subject coal-combustion-based structural material as compared with 72" wooden posts when both are placed in typical applications in a commercial coal mine.
Figure 10:
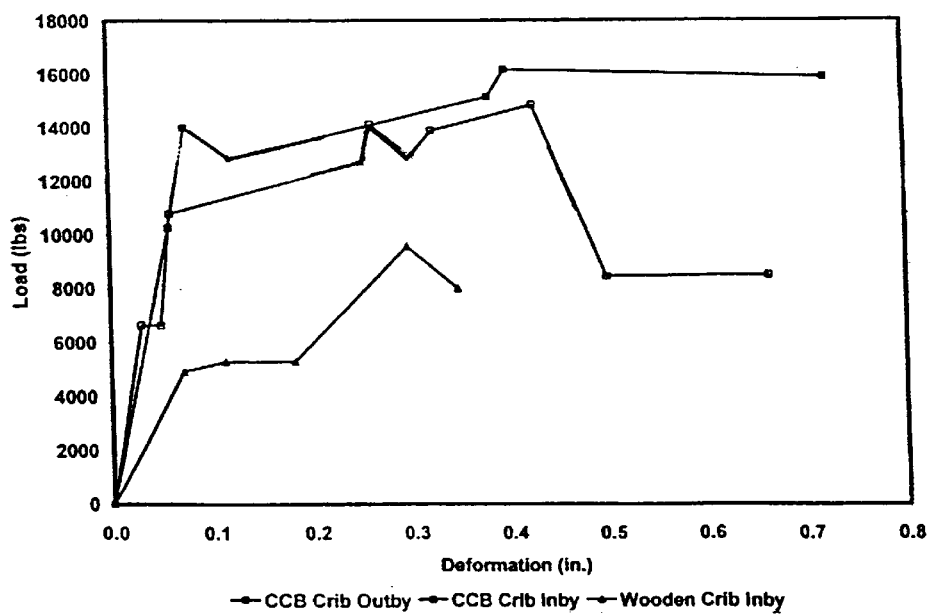
FIG. 10 shows the load supporting versus displacement characteristics of cribs of the subject coal-combustion-based structural material as compared with wooden cribs when both are placed in typical applications in a commercial coal mine.

The load-deformation characteristics were measured for all CCB-based and wooden posts and cribs over a period of time and the results are plotted in FIG. 9 for CCB and wooden posts installed at mine #1. The figure shows the superior load versus deformation performance of the CCB post. FIG. 10 shows the load versus deformation plot for CCB and wooden cribs in commercial mine #2. These data, like the data for the support posts, show the superior load-bearing capacity of the CCB-based cribs over the wooden crib.

EXAMPLE 7

This illustrates the variation in density and compressive strength for Class F fly ash from a commercial power plant for various mortar mix compositions.

Class F fly ash from Power Plant "S" was blended with FBC ash, cement, lime, water and density reduction materials in the amounts shown in Table 8. Each of the samples was cured as described in Example 4 and the density and compressive strength was tested for 2"×2" cubes of the cured mortar. Although the strength of all samples was about 25% lower than for most other Class F fly ashes, the variation in relative strength of the cured mortar was defined as a function of the composition of the mortars.

Two types of density reducers were tested in these mortar formulations, air entrainment chemical agents Rheocell 15 and Mearl liquid, available from Master Builder's, Inc., and Mearl Corporation, respectively. Stable foam could be introduced into the mortar at 40 psi to 50 psi. The density range for the foam ranged from about 0.03 to 0.045 g/cc. It was also found that density could be reduced by the addition to the mortar of rigid foam beads.

The mortars of the present example were cured by placing the molded samples in 100% relative humidity for 24 hours; demolding; and then transferring the samples either to 1) a hot water bath at 160° F. for 48 hours, or 2) to an ambient pressure steam chamber for 24 hours prior to testing for unconfined compressive strength and elastic modulus.

TABLE 8

Mix design matrix with Class F fly ash from Power Plant "S"

| Mix ID | Plant "S" F fly ash (%) | Cement (%) | FBC fly ash (%) | Lime (%) | Water (%) | Density Reducer[a] | Density (pcf) | Strength (psi) |
|---|---|---|---|---|---|---|---|---|
| M28 | 70 | 30 | 0 | 0 | 24 | — | 126 | 4100 |
| M28A | 70 | 30 | 0 | 0 | 24 | A | 116 | 3750 |
| M3 | 70 | 30 | 0 | 0 | 27 | F | 100 | 2600 |
| M24 | 70 | 30 | 0 | 0 | 28 | F | 87 | 1724 |
| M11 | 70 | 30 | 0 | 0 | 27 | A | 82 | 1817 |
| M12 | 70 | 30 | 0 | 0 | 27 | A | 73 | 1083 |
| M13 | 70 | 30 | 0 | 0 | 26 | A | 74 | 1220 |
| M7 | 70 | 30 | 0 | 0 | 30 | F | 69 | 753 |
| M14 | 70 | 30 | 0 | 0 | 29 | A | 52 | 328 |
| M26 | 68 | 30 | 0 | 2 | 31 | F | 96 | 1622 |
| M26A | 68 | 30 | 0 | 2 | 36 | F | 62 | 346 |
| M29 | 65 | 35 | 0 | 0 | 24 | — | 123 | 4212 |
| M33 | 65 | 35 | 0 | 0 | 28.5 | F | 100 | 2500 |
| M35 | 65 | 35 | 0 | 0 | 30 | F | 83 | 1407 |
| M22 | 65 | 35 | 0 | 0 | 30 | A | 78 | 1000 |
| M17 | 65 | 35 | 0 | 0 | 27 | A | 68 | 1272 |
| M18 | 65 | 35 | 0 | 0 | 28 | A | 62 | 761 |
| M34 | 65 | 35 | 0 | 0 | 30.5 | F | 58 | 271 |
| M31 | 60 | 40 | 0 | 0 | 27 | A | 80 | 2000 |
| M32 | 60 | 40 | 0 | 0 | 27.5 | F | 73 | 916 |
| M21 | 60 | 30 | 10 | 0 | 35 | A | 78 | 1131 |
| M22A | 60 | 30 | 10 | 0 | 36 | A | 70 | 805 |
| M19 | 50 | 30 | 20 | 0 | 35 | A | 80 | 1250 |
| M20 | 50 | 30 | 20 | 0 | 36 | A | 66 | 743 |

Notes:
a. Density reducers: A = Air entrainment agent (Mearl Liquid added as a liquid); F = foam produced from Mearl Liquid added as a foam.

EXAMPLE 8

This illustrates the superior performance of CCB-based support posts molded with disposable annular PVC pipe molds.

Figure 11B:
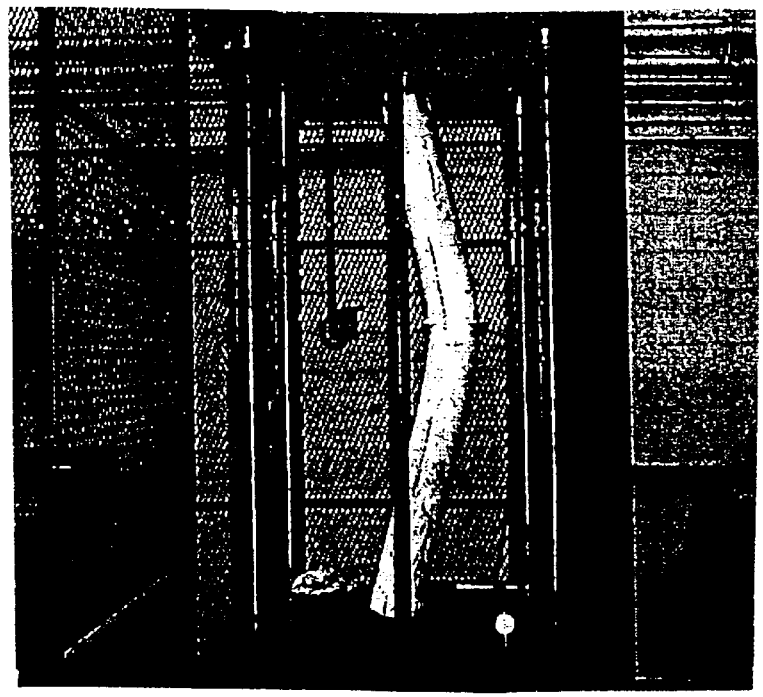
Figure 11C:
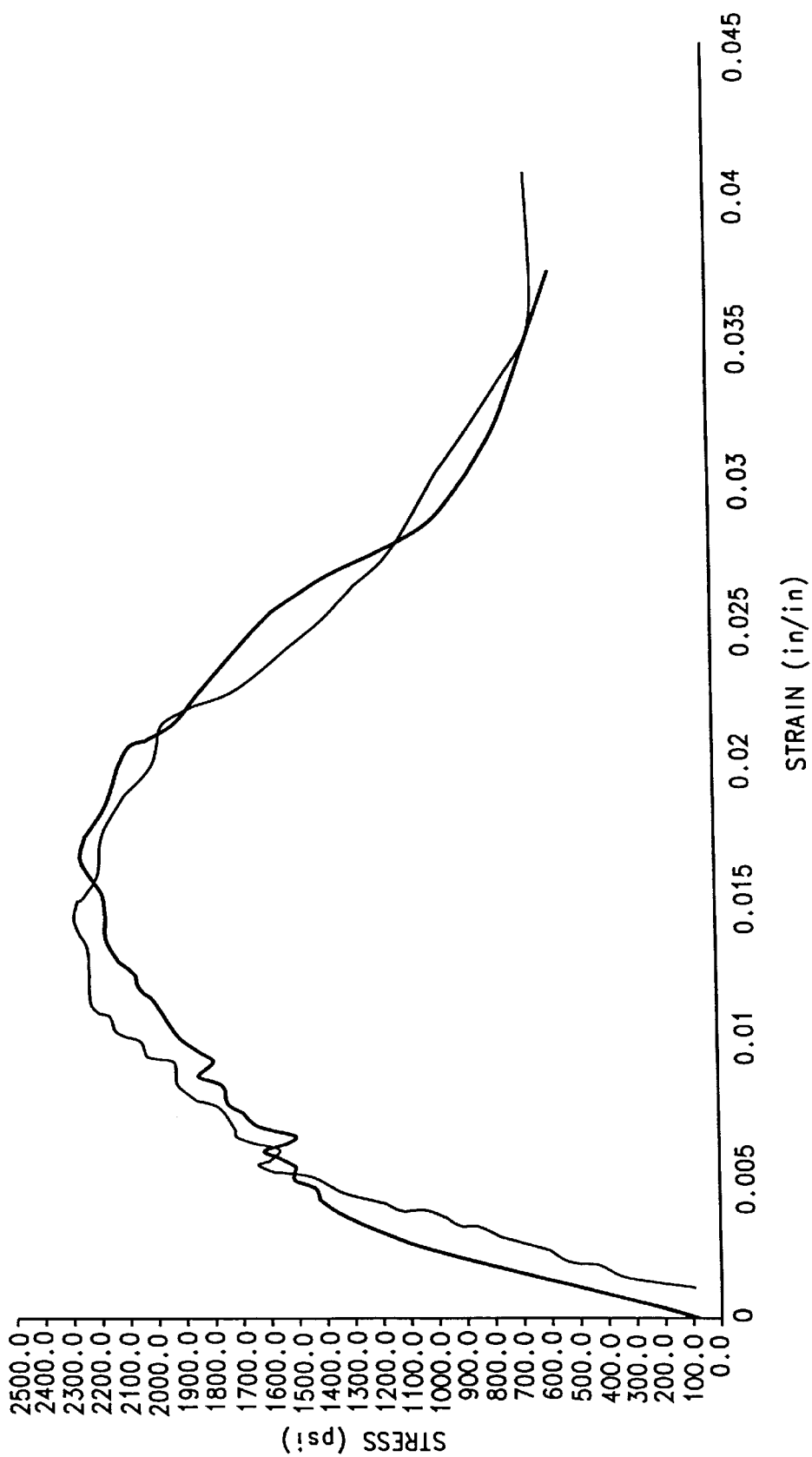

Full-sized support posts were produced from coal combustion byproduct materials that were prepared and cured by the method described in Example 4. Each structural member was 72" in length and molded in the form of a hollow post having an inner and an outer PVC pipe encasement. The outer pipe was a 6 inch diameter, schedule 10 PVC pipe and the inner pipe was a 2 inch diameter, schedule 10 PVC pipe. The annular space between the two pipes was filed with a mortar having a density of 90 pcf. The cross-section of the member is shown in FIG. 11(*a*).

The load-deformation characteristics were measured for the annular PVC encased posts as described in Example 5. Each post was tested until buckling occurred, as shown in FIG. 11(*b*) and the load versus deformation plot for two of the 72 inch posts is shown in FIG. 11(*c*). The plot shows the superior load-bearing capacity per unit weight for the PVC encased posts.

All references, including without limitation all papers, publications, presentations, texts, reports, manuscripts, brochures, internet postings, journal articles, periodicals, and the like, cited in this specification are hereby incorporated by reference. The discussion of the references herein is intended merely to summarize the assertions made by their authors and no admission is made that any reference constitutes prior art. The inventors reserve the right to challenge the accuracy and pertinence of the cited references.

In view of the above, it will be seen that the several advantages of the invention are achieved and other advantageous results obtained.

As various changes could be made in the above methods and compositions without departing from the scope of the invention, it is intended that all matter contained in the above description as shown in the accompanying drawings shall be interpreted as illustrative and not in a limiting sense.

What is claimed is:

1. A mortar mix comprising synergistic amounts of Class F fly ash and fluidized bed combustion (FBC) ash, and a cementitious material.

2. The mortar mix as set forth in claim 1, wherein the Class F fly ash-to-FBC ash weight ratio is at least about 2:1.

3. The mortar mix as set forth in claim 2, comprising about 50% to about 85% by weight Class F fly-ash and about 1% to about 20% by weight fluidized bed combustion (FBC) ash; and about 5% to about 30% by weight cementitious material.

4. The mortar mix as set forth in claim 3, comprising about 50% to about 75% by weight class F fly-ash and about 5% to about 15% by weight FBC ash; and about 20% to about 30% by weight cementitious material.

5. The mortar mix as set forth in claim 4, further comprising about 0.5–1.5% by volume fibers selected from the group consisting of cellulose, wool, cotton, hair, hemp, ramie, metal, carbon, boron, and polymeric fibers, and blends thereof.

6. The mortar mix as set forth in claim 5, wherein a blended cement replaces a portion of the cementitious material in an amount of about 1% to about 3% by weight of the mortar mix.

7. A mortar comprising about 22 parts to about 35 parts by weight water per 100 parts by weight of a mortar mix comprising synergistic amounts of Class F fly ash and fluidized bed combustion (FBC) ash, and a cementitious material.

8. A mortar as set forth in claim 7 wherein the weight ratio of the Class F fly ash to the FBC ash is at least about 2:1.

9. The mortar as set forth in claim 8, further comprising about 0.5–1.5% by volume fibers.

10. The mortar as set forth in claim 9, further comprising a density reducer in an amount sufficient to provide a cured mortar having a density of from about 50 to about 100 pounds per cubic foot.

11. The mortar as set forth in claim 10, wherein the Class F fly-ash and the FBC fly-ash are products of the combustion of coal.

12. The mortar as set forth in claim 11, wherein the Class F fly-ash contains less than 10% calcium oxide and has a loss on ignition of less that 10%.

13. The mortar as set forth in claim 12, wherein the FBC fly-ash comprises calcium oxide in an amount of from about 8% to about 30% by weight.

14. The mortar as set forth in claim 9, wherein the fibers are selected from the group consisting of synthetic fibers and natural fibers.

15. The mortar as set forth in claim 14, wherein the fibers are synthetic fibers and are selected from the group consisting of fibers of carbon, metal, polymer, and any blend thereof.

16. The mortar as set forth in claim 15, wherein the fibers are polymer fibers and are selected from the group consisting of fibers of nylon, polypropylene and polyester.

17. The mortar as set forth in claim 16, wherein the fibers are waste polyester carpet fibers having a longitudinally twisted aspect.

18. The mortar as set forth in claim 10, wherein the density reducer comprises an air entrainment material.

19. The mortar as set forth in claim 10, wherein the density reducer comprises a micro-bubble foam material.

20. The mortar as set forth in claim 11, wherein the FBC fly-ash is preconditioned FBC fly-ash.

21. The mortar mix as set forth in claim 1, wherein the Class F fly ash-to-FBC ash weight ratio is not over about 1:2.

22. The mortar mix as set forth in claim 21, comprising about 10% to about 25% by weight Class F fly-ash and about 50% to about 85% by weight fluidized bed combustion (FBC) ash; and about 5% to about 30% by weight cementitious material.

23. The mortar mix as set forth in claim 22, comprising about 10% to about 25% by weight class F fly-ash and about 60% to about 80% by weight FBC ash; and about 10% to about 20% by weight cementitious material.

24. The mortar mix as set forth in claim 23, further comprising about 0.5–1.5% by volume fibers selected from the group consisting of cellulose, wool, cotton, hair, hemp, ramie, metal, carbon, boron, and polymeric fibers, and blends thereof.

25. The mortar mix as set forth in claim 24, wherein a blended cement replaces a portion of the cementitious material in an amount of about 1% to about 5% by weight of the mortar mix.

26. A mortar comprising about 22 parts to about 35 parts by weight water per 100 parts by weight of a mortar mix comprising synergistic amounts of Class F fly ash and fluidized bed combustion (FBC) ash, and a cementitious material, wherein the weight ratio of the Class F fly ash to the FBC ash is at most about 1:2.

27. A mortar as set forth in claim 26 wherein the mortar mix comprises about 10% to about 25% by weight Class F fly ash, about 50% to about 85% by weight FBC ash and about 5% to about 30% by weight cementitious material.

28. The mortar mix as set forth in claim 27, further comprising about 0.5–1.5% by volume fibers selected from the group consisting of cellulose, wool, cotton, hair, hemp, ramie, metal, carbon, boron, and polymeric fibers, and blends thereof.

29. The mortar as set forth in claim 28, further comprising a density reducer in an amount sufficient to provide a cured mortar having a density of from about 20 to about 50 pounds per cubic foot.

30. The mortar as set forth in claim 29, wherein the Class F fly ash contains less than 10% calcium oxide and has a loss on ignition of less that 10%.

31. The mortar as set forth in claim 30, wherein the FBC fly ash contains calcium oxide in an amount of from about 8% to about 30% by weight.

32. The mortar as set forth in claim 28, wherein the fibers are selected from the group consisting of synthetic fibers and natural fibers.

33. The mortar as set forth in claim 32, wherein the fibers are natural fibers and are selected from the group consisting of animal fibers and plant fibers.

34. The mortar as set forth in claim 33, wherein the fibers are synthetic fibers and are selected from the group consisting of fibers of carbon, metal, polymer, and any blend thereof.

35. The mortar as set forth in claim 34, wherein the fibers are polymer fibers and are selected from the group consisting of fibers of nylon, polypropylene and polyester.

36. The mortar as set forth in claim 35, wherein the fibers are waste polyester carpet fibers having a longitudinally twisted aspect.

37. The mortar as set forth in claim 29, wherein the density reducer comprises an air entrainment material.

38. The mortar as set forth in claim 29, wherein the density reducer comprises a micro-bubble foam material.

39. The mortar as set forth in claim 31, wherein the FBC fly-ash is preconditioned FBC fly-ash.

40. The mortar as set forth in claim 29, wherein the cementitious material is portland cement.

41. The mortar as set forth in claim 29, wherein the cementitious material is cement kiln dust.

42. A structural composition comprising a cured product of a mortar comprising about 22 parts to about 35 parts by weight water per 100 parts by weight of a mortar mix comprising synergistic amounts of Class F fly ash and fluidized bed combustion (FBC) ash, and a cementitious material.

43. A structural composition as set forth in claim 42 wherein the weight ratio of the Class F fly ash to the FBC ash is at least about 2:1.

44. A structural composition as set forth in claim 43, wherein the mortar mix further comprises about 0.5–1.5% by volume fibers selected from the group consisting of nylon, polypropylene and polyester fibers.

45. The structural composition as set forth in claim 43, and having a density of about 50 pcf to about 100 pcf.

46. The structural composition as set forth in claim 45, and having a compressive strength of at least about 3000 psi.

47. A structural composition comprising a cured product of a mortar comprising about 22 parts to about 35 parts by weight water per 100 parts by weight of a mortar mix comprising synergistic amounts of Class F fly ash and fluidized bed combustion (FBC) ash, and a cementitious material, wherein the weight ratio of the Class F fly ash to the FBC ash is at most about 1:2 and the mortar mix comprises about 10% to about 25% by weight Class F fly ash, about 50% to about 85% by weight FBC ash, about 5% to about 30% by weight cementitious material, about 0.5–1.5% by volume fibers selected from the group consisting of cellulose, wool, cotton, hair, hemp, ramie, metal, carbon, boron, and polymeric fibers, and blends thereof, and a density reducer in an amount sufficient to provide a cured mortar having a density of from about 20 to about 50 pounds per cubic foot, and wherein the Class F fly ash contains calcium oxide in an amount of from about 8% to about 30% by weight.

48. A structural composition comprising a cured product of a mortar comprising about 22 parts to about 35 parts by weight water per 100 parts by weight of a mortar mix comprising synergistic amounts of Class F fly ash and fluidized bed combustion (FBC) ash, and a cementitious material, wherein the weight ratio of the Class F fly ash to the FBC ash is at most about 1:2.

49. A structural composition comprising a cured product of a mortar comprising about 22 parts to about 35 parts by weight water per 100 parts by weight of a mortar mix comprising synergistic amounts of Class F fly ash and fluidized bed combustion (FBC) ash, and a cementitious material, wherein the weight ratio of the Class F fly ash to the FBC ash is at most about 1:2 and the mortar mix comprises about 10% to about 25% by weight Class F fly ash, about 50% to about 85% by weight FBC ash, and about 5% to about 30% by weight cementitious material.

50. The structural composition as set forth in claim 49, and having a density of about 20 pcf to about 50 pcf.

51. The structural composition as set forth in claim 50, and having a compressive strength of at least 2000 psi.

52. A method for preparing a mortar mix comprising mixing together into a mortar mix about 50% to about 85% by weight Class F fly-ash and about 1% to about 20% by weight fluidized bed combustion (FBC) ash; and about 5% to about 30% by weight cementitious material.

53. A method for preparing a mortar mix comprising mixing together into a mortar mix about 10% to about 25% by weight Class F fly-ash and about 50% to about 85% by weight fluidized bed combustion (FBC) ash; and about 5% to about 30% by weight cementitious material.

54. A method for preparing a mortar comprising mixing together about 22 parts to about 35 parts by weight water per 100 parts of a mortar mix that includes about 50% to about 85% by weight Class F fly-ash and about 1% to about 20% by weight fluidized bed combustion (FBC) ash; and about 5% to about 30% by weight cementitious material.

55. The method as set forth in claim 54, wherein the mortar mix further comprises about 0.5% to about 1.5% by volume fibers selected from the group consisting of cellulose, wool, cotton, hair, hemp, ramie, metal, carbon, boron, and polymeric fibers, and blends thereof.

56. The method as set forth in claim 55, wherein the mortar mix further comprises a density reducer in an amount sufficient to provide a cured mortar having a density of from about 50 to about 100 pounds per cubic foot.

57. A method for preparing a mortar comprising mixing together about 22 parts to about 35 parts by weight water per 100 parts of a mortar mix that includes about 10% to about 25% by weight Class F fly-ash and about 50% to about 85% by weight fluidized bed combustion (FBC) ash; and about 5% to about 30% by weight cementitious material.

58. The method as set forth in claim 57, wherein the mortar mix further comprises about 0.5% to about 1.5% by volume fibers selected from the group consisting of cellulose, wool, cotton, hair, hemp, ramie, metal, carbon, boron, and polymeric fibers, and blends thereof.

59. The method as set forth in claim 58, wherein the mortar mix further comprises a density reducer in an amount sufficient to provide a cured mortar having a density of from about 20 to about 50 pounds per cubic foot.

60. A method for making a coal combustion by-product-based structural member comprising the steps of:
   a. preparing a mortar by mixing about 22 parts to about 35 parts by weight water with 100 parts by weight of a mortar mix comprising synergistic amounts of Class F fly ash and fluidized bed combustion (FBC) ash, and a cementitious material;
   b. molding the mortar into a shape; and
   c. curing the molded mortar into a structural member.

61. The method as set forth in claim 60, wherein the molding step includes bubble removal from the mortar prior to curing.

62. The method as set forth in claim 61, wherein the mortar is molded by placing the mortar in a mold and the curing includes exposing the molded mortar to high relative humidity followed by immersion of the molded mortar in water having a temperature of from about 140° F. to about 170° F.

63. The method as set forth in claim 62, wherein the molded mortar is exposed to the high relative humidity for about 8 to about 24 hours, the molded mortar is immersed in the water for an additional 24–48 hours, and the immersion step is followed by cooling of the molded mortar to ambient temperature over a period of about 10 to about 30 hours.

64. The method as set forth in claim 63, wherein the temperature during exposure to high relative humidity is maintained at 90° F. to about 120° F.

65. The method as set forth in claim 64, wherein the curing includes exposing the molded mortar to high relative humidity followed by exposure of the molded mortar to ambient pressure steam.

66. The method as set forth in claim 65, wherein the molded structural member is exposed to the high relative humidity for about 8 to about 24 hours and then exposed to ambient pressure steam for about an additional 24 to about 48 hours, followed by cooling to ambient temperature over a period of about 20 to about 30 hours.

67. The method as set forth in claim 66, wherein the temperature during exposure to high relative humidity is maintained at 90° F. to about 120° F.

68. The method as set forth in claim 63, wherein all curing is carried out without removing the molded mortar from the mold.

69. The method as set forth in claim 66, wherein all curing is carried out without removing the molded mortar from the mold.

70. The method as set forth in claim 62 wherein the molded mortar is removed from the mold after exposure to the high relative humidity and prior to immersion in the water.

71. The method as set forth in claim 63 wherein the molded mortar is removed from the mold after exposure to the high relative humidity and prior to immersion in the water and the exposure of the molded mortar to the high relative humidity takes place at ambient temperature.

72. A support member for use in mining comprising a cured product of about 50% to about 85% by weight Class F fly-ash; about 1% to about 20% by weight fluidized bed combustion (FBC) ash; about 5% to about 30% by weight cementitious material; about 0.5–1.5% by volume fibers selected from the group consisting of cellulose, wool, cotton, hair, hemp, ramie, metal, carbon, boron, and polymeric fibers, and blends thereof; about 22 parts to about 35 parts by weight water per 100 parts combined weight of the Class F fly-ash, the FBC ash, the cementitious material and the fibers; and a density reducer; the cured product having a density of from about 50 to about 100 pounds per cubic foot.

73. The support member as set forth in claim 72, having a compressive load carrying strength per unit weight that is at least equal to that of wood.

74. The support member as set forth in claim 73, wherein the support member is free of a mold.

75. The support member as set forth in claim 73, wherein the support member is provided with a disposable mold.

76. The support member as set forth in claim 75, wherein the disposable mold is sheet metal.

77. The support member as set forth in claim 75, wherein the disposable mold is plastic pipe.

78. The support member as set forth in claim 77, wherein the disposable mold is PVC pipe in an annular configuration.

79. A support member for use in mining comprising a cured product of about 10% to about 20% by weight Class F fly-ash; about 50% to about 85% by weight fluidized bed combustion (FBC) ash; about 5% to about 30% by weight cementitious material; about 0.5–1.5% by volume fibers selected from the group consisting of cellulose, wool, cotton, hair, hemp, ramie, metal, carbon, boron, and polymeric fibers, and blends thereof; about 30 parts to about 45 parts by weight water per 100 parts combined weight of the Class F fly-ash, the FBC ash, the cementitious material and the fibers; and a density reducer; the cured product having a density of from about 20 to about 50 pounds per cubic foot.

80. A method of supporting a mine ceiling, the mine also having a floor, comprising installing between the ceiling and the floor of the mine a support member comprising a cured product of about 50% to about 85% by weight Class F fly-ash; about 1% to about 20% by weight fluidized bed combustion (FBC) ash; about 5% to about 30% by weight cementitious material; about 0.5–1.5% by volume fibers selected from the group consisting of cellulose, wool, cotton, hair, hemp, ramie, metal, carbon, boron, and polymeric fibers, and blends thereof; about 22 parts to about 35 parts by weight water per 100 parts combined weight of the Class F fly-ash, the FBC ash, the cementitious material and the fibers; and a density reducer; the cured product having a density of from about 50 to about 100 pounds per cubic foot.

81. A method of supporting a mine ceiling, the mine also having a floor, comprising installing between the ceiling and the floor of the mine a support member comprising a cured product of about 10% to about 20% by weight Class F fly-ash; about 50% to about 85% by weight fluidized bed combustion (FBC) ash; about 5% to about 30% by weight cementitious material; about 0.5–1.5% by volume fibers selected from the group consisting of cellulose, wool, cotton, hair, hemp, ramie, metal, carbon, boron, and polymeric fibers, and blends thereof; about 30 parts to about 45 parts by weight water per 100 parts combined weight of the Class F fly-ash, the FBC ash, the cementitious material and the fibers; and a density reducer; the cured product having a density of from about 20 to about 50 pounds per cubic foot.

* * * * *